United States Patent
Kim et al.

(10) Patent No.: US 9,924,503 B2
(45) Date of Patent: Mar. 20, 2018

(54) METHOD AND APPARATUS FOR PERFORMING DEVICE-TO-DEVICE COMMUNICATION IN WIRELESS COMMUNICATION SYSTEM

(71) Applicants: LG ELECTRONICS INC., Seoul (KR); SNU R&DB Foundation, Seoul (KR)

(72) Inventors: Hakseong Kim, Seoul (KR); Kwangbok Lee, Seoul (KR); Jongwoo Hong, Seoul (KR); Sunghyun Choi, Seoul (KR); Kyungsoo Kim, Seoul (KR); Seonik Seong, Seoul (KR)

(73) Assignees: SNU R&DB FOUNDATION, Seoul (KR); LG ELECTRONICS INC., Seoul (KR)

( * ) Notice: Subject to any disclaimer, the term of this patent is extended or adjusted under 35 U.S.C. 154(b) by 100 days.

(21) Appl. No.: 14/434,362

(22) PCT Filed: Oct. 8, 2013

(86) PCT No.: PCT/KR2013/009009
§ 371 (c)(1),
(2) Date: Apr. 8, 2015

(87) PCT Pub. No.: WO2014/058221
PCT Pub. Date: Apr. 17, 2014

(65) Prior Publication Data
US 2015/0282132 A1    Oct. 1, 2015

Related U.S. Application Data

(60) Provisional application No. 61/711,710, filed on Oct. 9, 2012, provisional application No. 61/752,445, filed (Continued)

(51) Int. Cl.
*H04W 72/04* (2009.01)
*H04W 8/00* (2009.01)
(Continued)

(52) U.S. Cl.
CPC ....... *H04W 72/042* (2013.01); *H04L 43/0864* (2013.01); *H04W 4/08* (2013.01);
(Continued)

(58) Field of Classification Search
CPC ... H04W 8/005; H04W 76/023; H04W 48/16; H04W 4/08; H04W 72/042;
(Continued)

(56) References Cited

U.S. PATENT DOCUMENTS

2009/0017801 A1    1/2009   Laroia et al.
2009/0327391 A1   12/2009   Park et al.
(Continued)

FOREIGN PATENT DOCUMENTS

KR    10-2013-0035964    4/2013

OTHER PUBLICATIONS

Doppler, et al., "Advances in D2D Communications: Energy efficient Service and Device Discovery Radio," IEEE, Mar. 2011, 7 pages.
(Continued)

*Primary Examiner* — Paul H Masur
*Assistant Examiner* — Michael Phillips
(74) *Attorney, Agent, or Firm* — Lee, Hong, Degerman, Kang & Waimey

(57) ABSTRACT

The present invention provides a method and an apparatus performing device-to-device (D2D) communication in a wireless communication system. More particularly, D2D terminals supporting D2D communication are identified, discovery groups are formed for the D2D terminals using the same application, and discovery timing is established
(Continued)

depending on the discovery group such that D2D terminals belonging to the same discovery group are shifted to an active state during the discovery timing in order to transceive signals by using time and frequency resources designated for D2D discovery with the discovery timing having a variable value depending on the discovery group.

15 Claims, 21 Drawing Sheets

Related U.S. Application Data on Jan. 14, 2013, provisional application No. 61/752,917, filed on Jan. 15, 2013, provisional application No. 61/754,922, filed on Jan. 21, 2013.

(51) Int. Cl.
| | |
|---|---|
| *H04L 12/26* | (2006.01) |
| *H04W 4/08* | (2009.01) |
| *H04W 40/24* | (2009.01) |
| *H04W 48/16* | (2009.01) |
| *H04W 76/02* | (2009.01) |
| *H04W 76/04* | (2009.01) |

(52) U.S. Cl.
CPC ......... *H04W 8/005* (2013.01); *H04W 40/244* (2013.01); *H04W 40/246* (2013.01); *H04W 48/16* (2013.01); *H04W 76/023* (2013.01); *H04W 76/046* (2013.01)

(58) Field of Classification Search
CPC . H04W 76/021; H04W 76/046; H04W 88/08; H04W 40/244; H04W 72/0406; H04W 74/0833; H04W 48/08; H04W 72/0446; H04W 72/04; H04W 76/048; H04W 40/246; H04L 43/0864; H04L 45/7453; H04L 67/104; H04L 27/2607
See application file for complete search history.

(56) References Cited

U.S. PATENT DOCUMENTS

| | | | |
|---|---|---|---|
| 2010/0157955 A1 | 6/2010 | Liu et al. | |
| 2011/0098043 A1* | 4/2011 | Yu ......................... | H04W 60/00 455/435.1 |
| 2011/0235529 A1* | 9/2011 | Zetterberg ............ | H04L 5/0053 370/248 |
| 2012/0106517 A1 | 5/2012 | Charbit et al. | |
| 2013/0028177 A1* | 1/2013 | Koskela ................ | H04W 4/005 370/328 |
| 2013/0083753 A1 | 4/2013 | Lee et al. | |
| 2013/0083779 A1* | 4/2013 | Ahn ....................... | H04W 72/04 370/336 |
| 2013/0250771 A1* | 9/2013 | Yu ........................ | H04W 76/023 370/241 |
| 2013/0288668 A1* | 10/2013 | Pragada ................. | H04W 12/06 455/426.1 |
| 2014/0056220 A1* | 2/2014 | Poitau ................... | H04W 40/246 370/328 |
| 2014/0082185 A1 | 3/2014 | Abraham et al. | |
| 2015/0063095 A1* | 3/2015 | Deng .................... | H04W 8/005 370/221 |
| 2015/0111587 A1 | 4/2015 | Kalhan | |
| 2015/0131749 A1* | 5/2015 | Slomina ................ | H04J 11/005 375/260 |
| 2016/0112858 A1 | 4/2016 | Nguyen et al. | |

OTHER PUBLICATIONS

Fodor, et al., "Design Aspects of Network Assisted Device-to-Device Communications," IEEE Communications Magazine, Mar. 2012, pp. 170-177.
PCT International Application No. PCT/KR2013/009009, Written Opinion of the International Searching Authority dated Dec. 31, 2013, 1 page.
United States Patent and Trademark Office U.S. Appl. No. 14/434,368, Office Action dated Jul. 18, 2016, 36 pages.

\* cited by examiner

FIG. 7

```
-- ASN1START

RadioResourceConfigCommonSIB ::=     SEQUENCE {
    rach-ConfigCommon                    RACH-ConfigCommon,
    bcch-Config                          BCCH-Config,
    pcch-Config                          PCCH-Config,
    prach-Config                         PRACH-ConfigSIB,
    pdsch-ConfigCommon                   PDSCH-ConfigCommon,
    pusch-ConfigCommon                   PUSCH-ConfigCommon,
    pucch-ConfigCommon                   PUCCH-ConfigCommon,
    soundingRS-UL-ConfigCommon           SoundingRS-UL-ConfigCommon,
    uplinkPowerControlCommon             UplinkPowerControlCommon,
    ul-CyclicPrefixLength                UL-CyclicPrefixLength,
    ...,
    [[ uplinkPowerControlCommon-v1020    UplinkPowerControlCommon-v1020  OPTIONAL -- Need OR
    ]]
}
```

FIG. 18

```
-- ASN1START

MasterInformationBlock

MasterInformationBlock ::=    SEQUENCE {
    dl-Bandwidth                  ENUMERATED {
                                      n6, n15, n25, n50, n75, n100},
    phich-Config                  PHICH-Config,
    systemFrameNumber             BIT STRING (SIZE (8)),
    spare                         BIT STRING (SIZE (10))
}

-- ASN1STOP
```

METHOD AND APPARATUS FOR PERFORMING DEVICE-TO-DEVICE COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2013/009009, filed on Oct. 8, 2013, which claims the benefit of U.S. Provisional Application No. 61/711,710, filed on Oct. 9, 2012, 61/752,445, filed on Jan. 14, 2013, 61/752,917, filed on Jan. 15, 2013 and 61/754,922, filed on Jan. 21, 2013, the contents of which are all hereby incorporated by reference herein in their entirety.

BACKGROUND OF THE INVENTION

Field of the Invention

The present invention relates to wireless communication systems, and more particularly, to a method and apparatus for performing device-to-device communication in a wireless communication system.

Related Art

Recently, commercialization of the long term evolution (LTE) system, which is the next generation of wireless communication systems, has been supported earnestly. After the necessities were recognized that mass data service is to be supported in high-quality in response to users' request as well as voice service while ensuring users' mobility, the trend is that such an LTE system has been more rapidly expanded. The LTE system provides low transmission delay, high transmission rate, high system capacity and coverage improvement.

Meanwhile, in consideration of the requests of service provider that provides services to users, seek the benefit from the improvement of performances of the existing radio access or network and the way of recouping the investment costs for wireless communication systems which have been already invested so that the LTE system has been evolved in the form of maintaining or coexisting the compatibility with 2G communication system, which is the global system for mobile communications (GSM) based on the time division multiple access (TDMA), and with 3G communication system, which is the universal mobile telecommunication system (UMTS) based on the wideband code division multiple access (W-CDMA).

Particularly, with the advent of smart phones and tablet personal computers (PCs) recently, the users of actual communication devices require the services that enable you to easily obtain or share the information desired at any place and any time they want. However, it is not easy to effectively provide real-time information that is trivial but useful for users in real life situation due to the complexity of system or time delay of the wireless communication systems.

Meanwhile, a device to device (D2D) service, which is performed through a direct communication link among communication devices, without going through a network entity such as a base station, has emerged as an issue. This may be regarded that the wireless communication system is urgently needed to be developed/improved to support the environment in which users can share and obtain various information. In relation to this, the way and technique of effective data transmission and reception in wireless communication systems, which support the D2D service, are needed.

SUMMARY OF THE INVENTION

The present invention provides a method and apparatus for performing a direct device-to-device communication in a wireless communication system.

The present invention also provides a method and apparatus for performing communication by a user equipment in an idle state.

The present invention also provides a method and apparatus for searching a user equipment that performs communication in considering discontinuous reception (DRX) in a wireless communication system.

The present invention also provides a method and apparatus for performing search considering the D2D service in wireless communication system.

In an aspect, a method for performing a device-to-device (D2D) communication service in a wireless communication system is provided. The method includes distinguishing a cellular user equipment that supports a cellular communication with a base station (eNB) from a device-to-device (D2D) user equipment that supports D2D communication, forming a discovery group for the D2D user equipments that uses a same application, configuring a discovery timing according to the discovery group, transmitting and receiving a signal using a predetermined time and frequency resources for a D2D discovery, by being shifted to an active state by the D2D user equipments belong to a same discovery group at the discovery timing, and transmitting and receiving D2D data by configuring a D2D link.

In another aspect, an apparatus for performing a device-to-device (D2D) communication service in a wireless communication system is provided. The apparatus includes a radio frequency unit that transmits and receives radio signals, and a processor connected with the radio frequency unit, the processor is configured to perform: distinguishing a device-to-device (D2D) user equipments that support D2D communication, forming a discovery group for the D2D user equipments that uses a same application, configuring a discovery timing according to the discovery group, transmitting and receiving a signal using a predetermined time and frequency resources for a D2D discovery, by being shifted to an active state by the D2D user equipments belong to a same discovery group at the discovery timing, wherein the processor controls transmitting and receiving D2D data by configuring a D2D link through the transmitted and received signal.

ADVANTAGEOUS EFFECTS

The present invention has advantages in terms of satisfying the service requests of each of user equipments through a D2D communication link to the maximum in the wireless communication environment that a plurality of user equipments and communication devices coexist, i.e., guaranteeing data transmission, reception and retransmission for the requested service by the corresponding user equipment to the maximum. Accordingly, the present invention has advantages of supporting requests for wireless data traffic which is abruptly increasing and overall system performance.

Therefore, the D2D communication provides advantages that are increasing the proximity and efficiency of resource, and decreasing the load of infra, and particularly, the D2D communication based on cellular network provides advantages such as power saving, shortening access time, saving frequency resource, and so on.

BRIEF DESCRIPTION OF THE DRAWINGS

FIG. 7 illustrates an example of RRC signaling that includes the information of cyclic prefix length according to the present invention.

FIG. 18 schematically illustrates an example of a MIB configuration according to the present invention.

DESCRIPTION OF EXEMPLARY EMBODIMENTS

Figure 1:
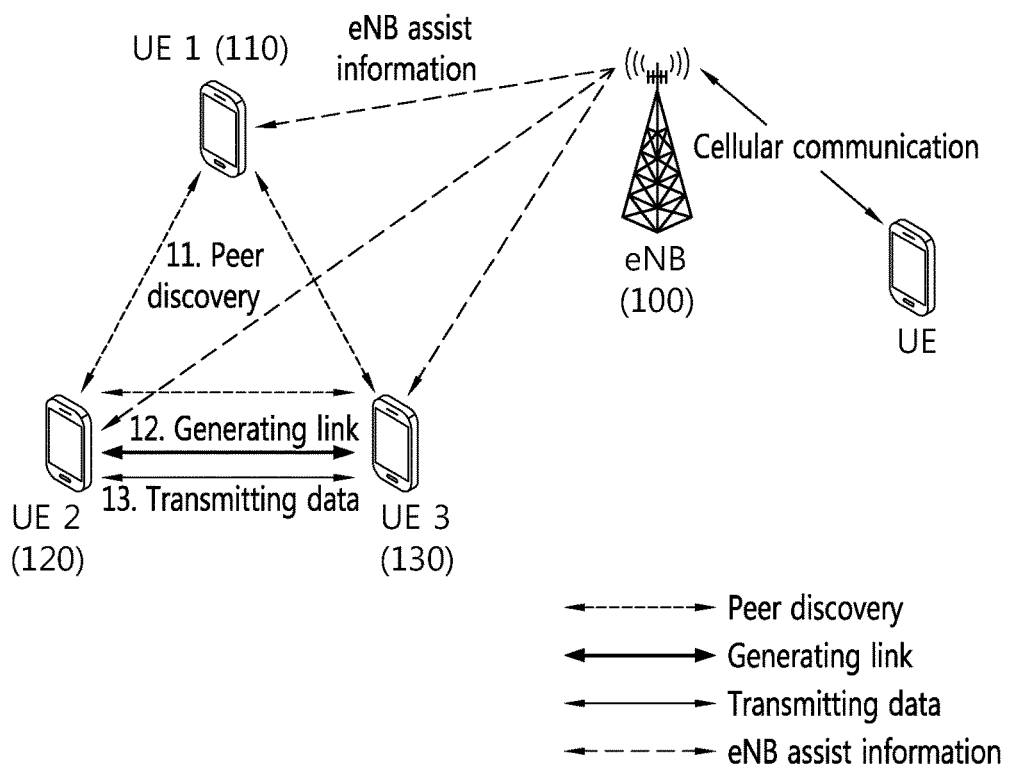
FIG. 1 schematically illustrates a structure of a wireless communication system to which the present invention is applied.

Hereinafter, the preferred embodiment of the present invention now will be described in detail by reference to the accompanying exemplary drawings in this specification. In attaching reference numerals to elements in each drawing, it should be understood that the same reference numeral is used for the same element even if the element is shown in different drawings. In addition, in case that the detailed description for the related known elements and functions is determined to obscure the inventive concept in this specification, the redundant description for the same element will be omitted.

In addition, the present specification describes wireless communication network as an object, the tasks performed in the wireless communication network may be performed during the process of controlling the network in the system (for example, a base station) that controls the corresponding wireless communication network and transmitting data, or performed by the user equipment that is coupled to the corresponding wireless network.

FIG. 1 schematically illustrates a structure of a wireless communication system to which the present invention is applied. The drawing depicts a network structure of evolved-universal mobile telecommunications system (E-UMTS). The E-UMTS system is also called long term evolution (LTE) or LTE-advanced (LTE-A) system, and refers to a packet based system to provide various communication services such as voice, packet data, and so on.

Referring to FIG. 1, the E-UTRAN includes an evolved-NodeB (eNB) 100 that provides a control plane and a user plane for user equipments (UEs) 110, 120 and 130. The UEs 110, 120 and 130 may be fixed or have mobility, and may be called other terms such as a mobile station (MS), an advanced mobile station (AMS), a user terminal (UT), a subscriber station (SS), a wireless device, and the like.

The eNB 100 generally refers to a station that communicates with the UEs 110, 120 and 130, and may be called other terms such as a base station (BS), a base transceiver system (BTS), an access point (AP), a femto eNB, a pico-eNB, a Home nodeB, relay, and so on. The eNB 100 may provide services for a UE through at least one cell. The cell may signify a geographical region that provides communication service by the eNB 100, or signify a specific frequency band. Or, the cell may signify downlink frequency resources and uplink frequency resources. Or, the cell may signify the combination of the downlink frequency resources and optional uplink frequency resources. In addition, the cell should be interpreted as inclusive meaning that represents a partial region which is covered by the eNB 100. And the cell may be defined as a mega cell, a macro cell, a micro cell, a pico cell, a femto cell, etc. according to the size, and the cell should be interpreted as inclusive meaning that includes all of various coverage and regions according to the present invention.

Hereinafter, downlink refers to transmission link from the eNB 100 to the UEs 110, 120 and 130, and uplink refers to transmission link from the UEs 110, 120 and 130 to the eNB 100. In downlink, a transmitter may be a part of the eNB 100 and a receiver may be a part of the UEs 110, 120 and 130. In uplink, a transmitter may be a part of the UEs 110, 120 and 130, and a receiver may be a part of the eNB 100.

Various multi access methods may be used such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA in the present invention. In addition, as the uplink transmission and the downlink transmission, a Time Division Duplex (TDD) scheme transmitted using different times may be used. Or, a Frequency Division Duplex (FDD) scheme transmitted using different frequencies may be used.

Meanwhile, the physical layers applied to the present invention include a physical downlink control channel (PDCCH), a physical control format indicator channel (PCFICH), a physical hybrid ARQ indicator channel (PHICH), a physical uplink control channel (PUCCH), and so on. Herein, the PDCCH may carry the resource allocation and the transmission format of a downlink shared channel (DL-SCH), the resource allocation information of a uplink shared channel (UL-SCH), the paging information on a PCH, the system information of the DL-SCH, the resource allocation of higher layer control message such as a random access response transmitted on a PDSCH, the set of transmission power control command for individual UEs in an arbitrary UE group and the activation of voice over internet protocol (VoIP), and so on. The PCFICH carries the number of OFDM symbol (i.e., size of control region) which is used for transmission of control channels in a subframe. The PHICH carries Acknowledgement (ACK)/Non-acknowledgement (NACK) signals which are the response signals to a Hybrid Automatic Repeat Request (HARQ) for the uplink transmission. The PUCCH carries the uplink control information such as the HARQ ACK/NACK for downlink transmission, the scheduling request, and a channel quality indicator (CQI).

Furthermore, in recent years, the mobile internet traffic has rapidly increased, and it is anticipated that such a trend will last for the time being. While overload of cellular communication network becomes serious due to the increase of mobile traffic, service providers try to solve the overload problem by introducing LTE, femto cell, wireless LAN, and the like. Such an effort has common ground of trying to decrease the overload of eNB by replacing and expanding infra. Meanwhile, as a method of decreasing the overload without replacing and expanding infra, the D2D communication that sends and receives traffic directly among UEs without infra has been magnified.

Although the definition of such a D2D communication is not clearly established at the moment, the D2D communication may signify a direct communication among UEs without any infra of network systems. This signifies a communication that directly exchanges traffic among UEs not by introducing a small eNB such as a femto cell or a pico cell and nor by an eNB. Since such a D2D communication has an advantage in proximity compared with the existing communication through infra, for example, in the aspect of power transmission, if the distance among UEs is close, the communication is available in lower power than the case of exchanging traffic with an eNB located far away, which is more effective. The advantage enables the efficiency of limited radio resources to increase whereas the load of network infra to decrease. The efficiency of limited radio resources signifies that the frequency reuse factor may also be increased since the D2D communication is available in low power and several D2D links are available to communicate even in the same cell.

Particularly, since the D2D communication based on the cellular network has advantages such as power saving, shortening access time, saving frequency resource, and so on, various researches have been published. In addition, since the applications such as social network, mobile advertisement, short distance file transfer, etc. in which mobile traffic has been rapidly increased are considered as applications that are suitable for the D2D communication, basically the demand for D2D communication is anticipated to increase more in the future.

As shown in FIG. 1, such a D2D communication procedure may include a step of peer discovery 11 for searching neighboring D2D UEs in which the D2D communication is available, a step of link generation 12 for connecting a UE which is going to transmit data among D2D UEs found in the step of peer discovery 11 to a wireless link, and a step of data transmission 13 for transmitting traffic among the UEs connected with the wireless link. Although detailed procedure may vary according to actual D2D communication method, it can be said that the above three steps are general.

In more particular, the first step for D2D communication is the step of peer discovery 11. The step of peer discovery 11 is a step that each D2D UE searches other UEs that are available to perform D2D communication nearby. In this step, each of the UEs transmits search signals such that other UEs may find the UE and receives search signals transmitted from other UEs, and finds other UEs that are available to perform D2D communication are located within a range.

The second step for D2D communication is the step of link generation 12. In the step of link generation 12, a UE which is going to transmit data among D2D UEs found in the step of peer discovery 11 is linked to transmit data. Generally, the link is established when a UE sends a signal for requesting a link generation to other UE, the corresponding UE receives the signal and sends a response signal.

When a neighboring UE is found in the step of peer discovery and a link is established among the UEs that are going to exchange data in the step of link generation, the two UEs linked each other exchange data. This step is called the step of data transmission 13. Through the step, the UEs in which D2D link is established perform data transmission on predetermined time and frequency.

Such a D2D communication technique may be divided into a D2D communication based on the cellular network and a D2D communication that does not utilize infra of the cellular network in the least. The D2D communication based on the cellular network uses the information received from an eNB in the step of peer discovery and receives a help from the cellular network when performing resource allocation and power control when transmitting data for traffic transmission. This is more effective in power saving, access time, resource application, etc. that those of the D2D communication that does not utilize infra of the cellular network.

Meanwhile, a Peer discovery technique based on the cellular network may be divided into an A-priori peer discovery technique and an A-posterior peer discovery technique based on target UE to be searched. The A-priori peer discovery technique signifies a technique of performing search among the D2D UEs in which session is not setup. The A-priori peer discovery technique based on the cellular network signifies a way of searching UE using the broadcasting information of eNB and a technique of searching UE through register/request processes by a network entity, for example, a mobile management entity (MME). Hereinafter, this will be briefly described through FIG. 2 and FIG. 3.

Figure 2:
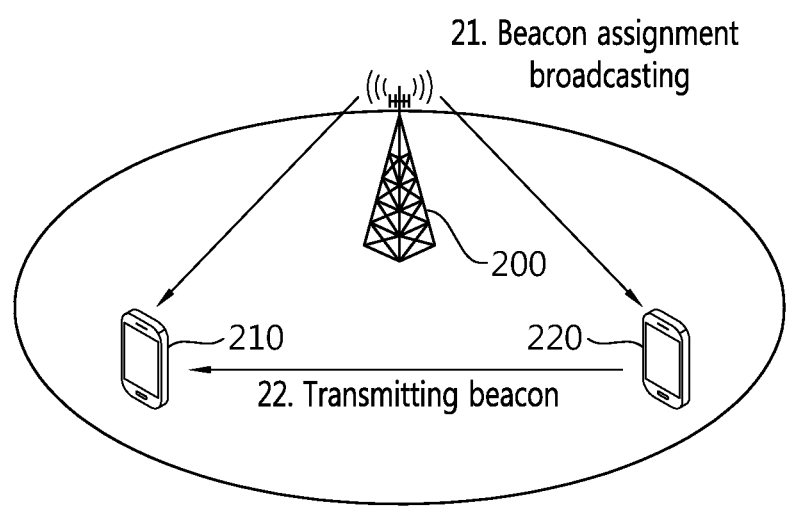
FIG. 2 schematically illustrates a peer discovery procedure using the broadcasting information in a wireless communication system to which the present invention is applied.

FIG. 2 schematically illustrates a peer discovery procedure using the broadcasting information in a wireless communication system to which the present invention is applied. This is one of the A-priori peer discovery techniques, and a method that UEs search each other using the broadcasting information of eNB will be described.

Referring to FIG. 2, an eNB 200 continuously broadcasts that each of the UEs 210 and 220 is allocated to which beacon resource to the D2D UEs (step, 21). Each UE is available to know the beacon allocated to itself based on the broadcasting information.

Each UE receives beacon assignments that are broadcasted from the eNB, and notifies the existence of the UE to other UEs by transmitting the assigned beacon through a predetermined communication resource (step, 22). Then, each of the UEs searches which D2D UEs are present nearby by searching beacon based on the information broadcasted by the eNB on the time when the beacon is not transmitted.

Figure 3:
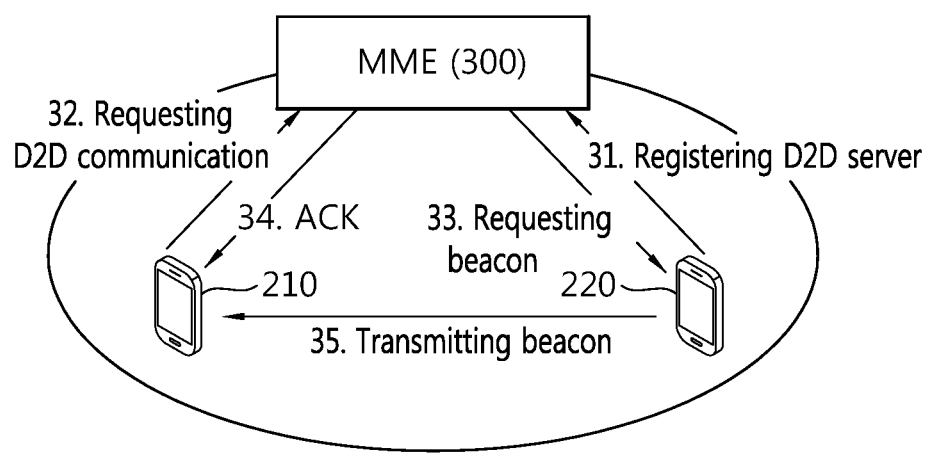
FIG. 3 schematically illustrates a peer discovery procedure using a network entity in a wireless communication system to which the present invention is applied.

FIG. 3 schematically illustrates a peer discovery procedure using a network entity in a wireless communication system to which the present invention is applied. This is one of the A-priori peer discovery techniques, and a method of searching UE through register/request processes to the network entity will be described.

Referring to FIG. 3, first, a server UE 310 that is going to send beacon notifies that the D2D communication is available to an MME 300, and simultaneously, registers its UE and service information (step, 31). When receiving a request from a client UE that the D2D communication is available, the MME 300 requests to send beacon to the D2D server UE by verifying if there is a server UE to communicate with the corresponding client UE based on the information of server UE which is registered (steps, 32 and 33). The server UE sends the requested beacon and the client UE receives this such that the D2D search procedure is available (steps, 34 and 35). Herein, the MME has the access information of UE or the information of UE's capacity, and the information is mainly used for the mobility management of UE. Accordingly, the method of FIG. 3 provides more information during the peer discovery procedure than that of in FIG. 2, and thereby the UEs may save resources consumed in the peer discovery.

Meanwhile, the A-posteriori peer discovery technique signifies a technique that each UE performs the peer discovery by targeting the UE existed in the same eNB among different UEs having a session which is already generated. That is, in the A-posteriori peer discovery technique, the peer discovery is, different from the A-priori peer discovery technique of searching arbitrary UEs nearby, a process of verifying whether there is a UE, which already has a session, located within a range where D2D communication is available with its own. In this reason, the A-posteriori peer discovery technique includes a method of using token and a method of analyzing internet protocol (IP) address according to a method of determining if two UEs that have a session exist in the same eNB. Hereinafter, this will be described through FIG. 4 and FIG. 5.

Figure 4:
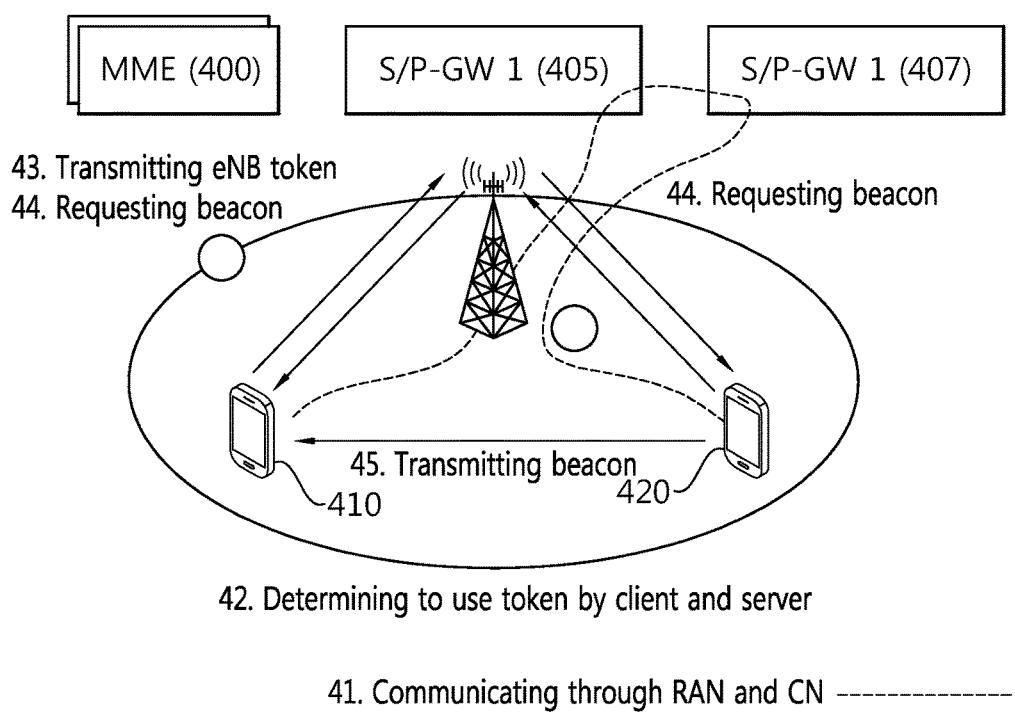
FIG. 4 schematically illustrates a peer discovery procedure using a token technique in a wireless communication system to which the present invention is applied.

FIG. 4 schematically illustrates a peer discovery procedure using a token technique in a wireless communication system to which the present invention is applied.

Referring to FIG. 4, the search technique using the token is a method of determining whether there exist two UEs that have a session in the same eNB using a distinctive token which is distinguishable by the eNB. When the UEs 410 and 420 that have a session, that is, the UEs that perform a communication through a radio access network (RAN) and a core network (CN) (step, 41) exchange tokens using the session of communication, the eNB may know the two UEs that have a session are in the same eNB by distinguishing the tokens (step, 42). If it is determined that two UEs are in the same eNB, the eNB requests one UE to transmit a beacon (step, 43) and requests another UE to receive the beacon (step, 44). If the beacon is properly received (step, 45), two UEs successfully complete the peer discovery and are determined to be located in the range where the D2D communication is available.

Herein, according to LTE system, the combination of E-UTRAN and EPC is called an evolved packet system (EPC), and the traffic flow that is ranged from all of wireless links through which the UEs 410 and 420 access the eNB to a packet data network that is connected to a service entity may be operated based on internet protocol (IP). An S-GW is a gateway having an endpoint of E-UTRAN, and a P-GW is a gateway having an endpoint of a packet data network. Through this, the flow of packet traffic of UEs is controlled by start/end. Thus, an MME 400 exchanges operation and management (OAM) information for supporting movement of UEs 510 and 520 with S-GW 505/P-GW 507 through S1-U. Through this, the flow of packet data according to movement of UE is controlled.

Figure 5:
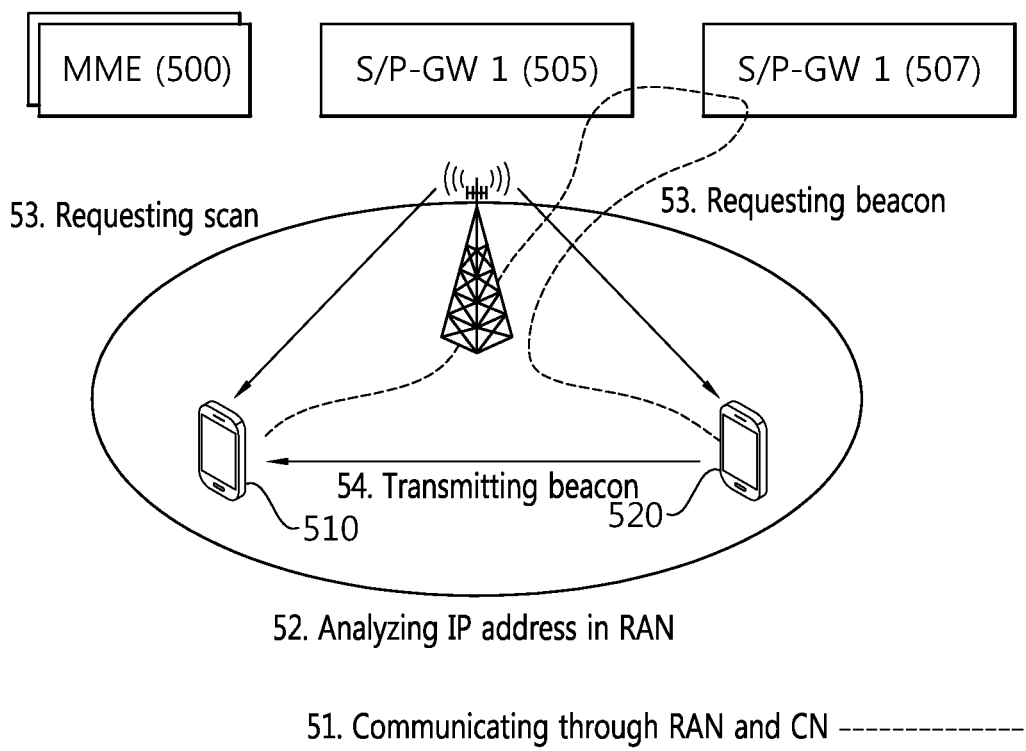
FIG. 5 schematically illustrates a peer discovery procedure considering an internet protocol address in a wireless communication system to which the present invention is applied.

FIG. 5 schematically illustrates a peer discovery procedure considering an internet protocol address in a wireless communication system to which the present invention is applied.

Referring to FIG. 5, a search technique using IP address analysis is a method of verifying if a transmission UE and a reception UE are in the same eNB by analyzing an IP address of a session. For the UEs that has a session generated (step, 51), that is, for the UEs that perform communication through the RAN and the CN, if two UEs are determined to be in the same eNB through the IP address analysis in S/P-gateway (GW), like the method of using tokens, the eNB requests one UE to transmit a beacon and requests another UE to receive the beacon (step, 53). If the beacon is successfully received, it is determined that the peer discovery is successful and the D2D communication is available (step, 54).

As mentioned above, it is under active discussion on the ways of the peer discovery technique of D2D communication utilizing an eNB and a network for power saving, shortening access time, frequency resource efficiency, and also various scenarios for the peer discovery are available.

Hereinafter, in the present invention, in particular, a search technique based on the peer discovery technique that performs the peer discovery by directly exchanging beacons among UEs by an eNB as shown in FIG. 2 will be described in more detail. For a wireless communication system according to the present invention to which the LTE system is applied, it is going to propose a way for D2D peer discovery that is optimized for the resources used by an eNB. For this, a D2D peer discovery way and search protocol according to effective power use will be proposed based on the power problems, which may occur when many D2D UEs search through the eNB of LTE system. In addition, when performing the peer discovery utilizing an eNB, in order to solve the problem that a signaling overhead seriously occurs between eNB and UE, a peer discovery technique, which decreases the overhead between eNB and UE and also is good at peer discovery performance, will be proposed. Additionally, detailed ways will be proposed for a synchronization problem that may occur in the D2D peer discovery operation and beacon signals for search.

Figure 6:
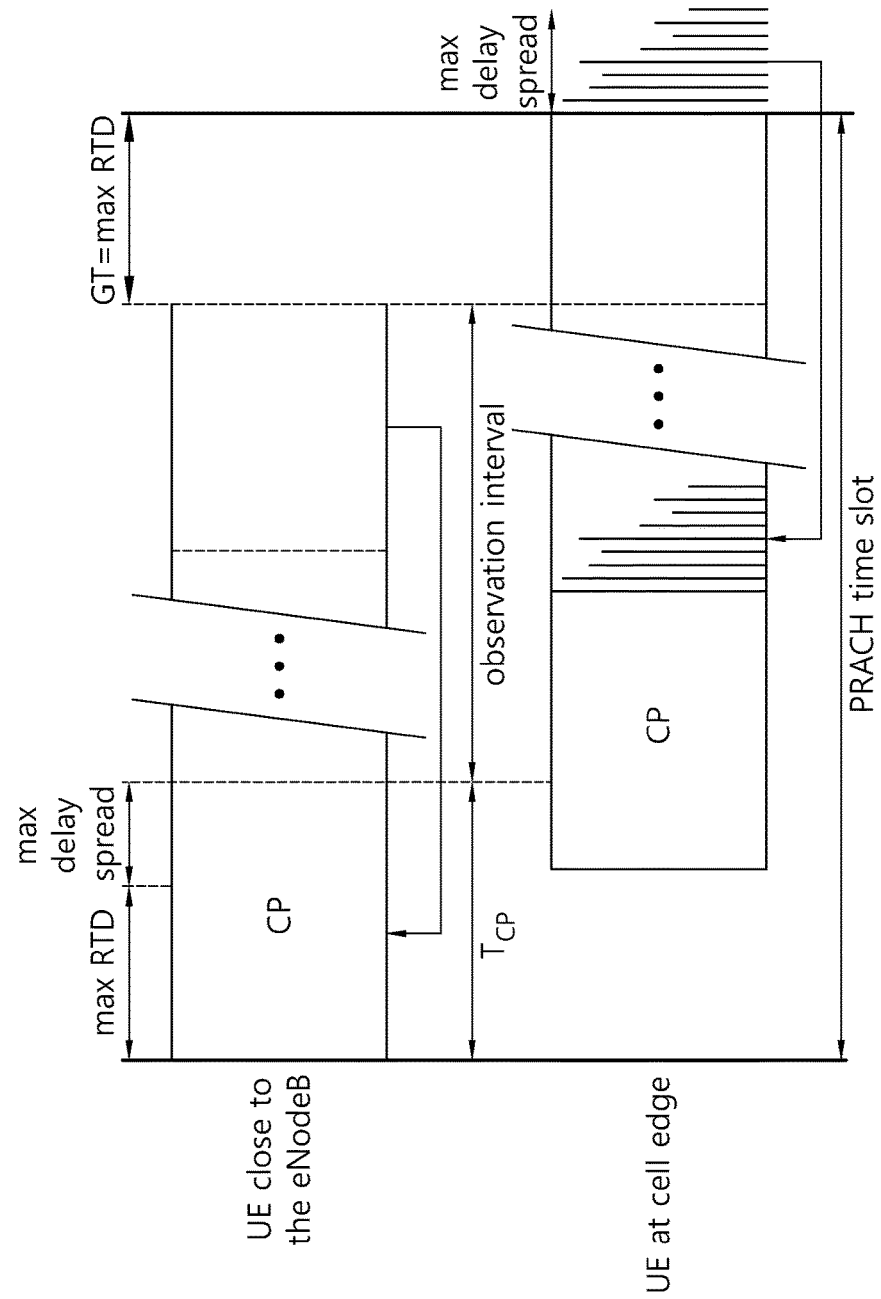
FIG. 6 schematically illustrates a PRACH time slot structure for synchronizing among D2D UEs according to the present invention.

Firstly, FIG. 6 schematically illustrates a PRACH time slot structure for synchronizing among D2D UEs according to the present invention.

Referring to FIG. 6, the D2D search is operated in uplink, and the UEs should be synchronized for the D2D search. In order to synchronize in uplink, the UEs in a cell are required to perform a random access procedure. Meanwhile, when it is going to proceed the search procedure by considering uplink synchronization based on downlink signals without performing the RACH procedure, a max round trip delay (RTD) and a delay spread among D2D UEs as well as the max RTD and the delay spread between an eNB and the D2D UE should be considered.

As an example, in order to solve the synchronization problem, suppose that a time slot of a physical random access channel (PRACH) of the LTE system is configured by considering the max RTD and the propagation delay. In case of the delay spread, it is supposed that the root mean square (RMS) value is about nsec for the typical urban model defined in ITU model. Accordingly, the configuration of cyclic prefix (CP) of PRACH should be configured to be longer than sum of the max RTD and the delay spread, considering the max RTD and the delay spread. That is, the delay that occurs in the max RTD and the delay spread may be corrected by using the CP. This may be represented as Equation 1 below.

PRACH CP=max RTD(uplink sync correction between eNB and UE)+max delay spread [Equation 1]

Furthermore, in the last of time slot of PRACH, it is designed not to influence the symbol in the next subframe even in case of max RTD, that is, the case that a UE located on an edge of cell, considering max RTD, like a guard time (GT).

Table 1 below represents an example of PRACH preamble format which is applicable to the present invention.

TABLE 1

| Preamble format | $T_{CP}$ (μs) | $T_{SEQ}$ (μs) | Typical usage |
|---|---|---|---|
| 0 | 103.13 | 800 | Normal 1 ms RA burst with 800 μs preamble sequence. for small-medium cells (up to ~14 km |
| 1 | 684.38 | 800 | 2 ms RA burst with 800 μs preamble sequence. for large cells (up to ~77 km) without a link budget problem |
| 2 | 203.13 | 1600 | 2 ms RA burst with 1600 μs preamble sequence, for medium cells (up to ~29 km) supporting low data rates |
| 3 | 684.38 | 1600 | 3 ms RA burst with 1600 μs preamble sequence. for very large cells (up to ~100 km) |

Meanwhile, two sorts of CPs are defined in the LTE system. There are a normal CP (4.7 μsec) of which one subframe is comprised of seven symbols and an extended CP (16.7 μsec) of which one subframe is comprised of six symbols. That is, in case of the normal CP, CP is attached in front of seven symbols in one slot, and in order to fit the whole length, only the foremost CP has a length of about 5.2 μs and the remainder six CPs has a length of about 4.6 μs. On the other hand, the extended CP has 512 Ts (Ts=1/(15000×2048) sec) in one OFDM symbol, and has six symbols per slot when the subcarrier spacing is 15 kHz by applying the extended CP. It is characterized that the number of symbol per slot is decreased by applying the MBSFN, but the transmission rate in the overall radio section may be increased by increasing the MCS level using the advantage of obtaining diversity effect in a boundary of cell, and the cell coverage may be expanded. Meanwhile, the structure of radio frame is just an example, the number of subframes included in the radio frame, the number of slots included in the subframe, or the number of OFDM symbols included in the slot may be changed to various forms according to a wireless system which is applied.

In the present invention, in order to solve the synchronization problem which is occurred among cells or D2D UEs, the extended CP that has relatively longer length than the normal CP is utilized, and the D2D discovery is performed by assigning a specific time to the extended CP.

Herein, in 3GPP LTE to which the present invention is applied, a candidate cell is searched using a synchronization signal and a serving cell is selected through a reference signal. That is, a UE performs an initial cell search via a primary synchronization signal (PSS), a secondary synchronization signal (SSS), and a CRS. In briefly describing the procedure, a UE which is turned on from the state of turned off or newly entering a cell performs the initial cell search operation such as synchronizing with an eNB, and the link. For this, the UE synchronizes with the eNB by receiving a primary synchronization channel (P-SCH) and a secondary synchronization channel (S-SCH) from the eNB, and acquires information such as a cell identity (ID), and so on. Then, the UE may acquire broadcast information within cell by receiving a physical broadcast channel (PBCH) or a physical multicast channel (PMCH), which uses the extended CP always according to the present invention, from the eNB. As an example, the PCH is characterized by supporting DRX resource for saving power of UE and broadcasting to UEs within entire area of cell. The PMCH is characterized by broadcasting to UEs within entire area of cell and supporting a MBMS single frequency network (MBSFN). Herein, the MBSFN uses common scrambling code and spreading code to broadcast the identical MBMS channel simultaneously in a plurality of cells that forms an MBSFN cell group. Accordingly, only radio resource for a shared channel is assigned among D2D UEs, and a plurality of UEs receives the shared channel at the same time, thereby an efficiency of radio resources may be increased.

Meanwhile, a UE may verify a downlink channel state by receiving a downlink reference signal (DL RS) in the step of initial cell search. The UE that completes the initial cell search may acquire more detailed system information by receiving a physical downlink control channel (PDCCH) and a physical downlink control channel (PDSCH) according to the PDCCH information.

Later, the UE may perform the RACH in order to complete an access to the eNB. For this, the UE may transmit a preamble via a physical random access channel (PRACH), and receive a response message in response to the preamble via the PDCCH and the PDSCH that corresponds to the PDCCH. In case of a contention based random access, a contention resolution procedure such as transmission of additional PRACH and reception of the PDCCH and the PDSCH that corresponds to the PDCCH.

In relation to this, FIG. 7 illustrates an example of RRC signaling that includes the information of cyclic prefix length according to the present invention.

As shown in FIG. 7, by signaling to a D2D UE with ul-CyclicPrefixLength information element (IE) being included, the D2D UEs are synchronized using the ul-CyclicPrefixLength. The information of cyclic prefix length is transmitted via SIB2 of a RRC message. For the D2D discovery according to the present invention, the CyclicPrefixLength has a max RTD between eNB and UE, a delay spread, and a predetermined value with the max RTD between eNB and UE, and the delay spread being considered.

Figure 8:
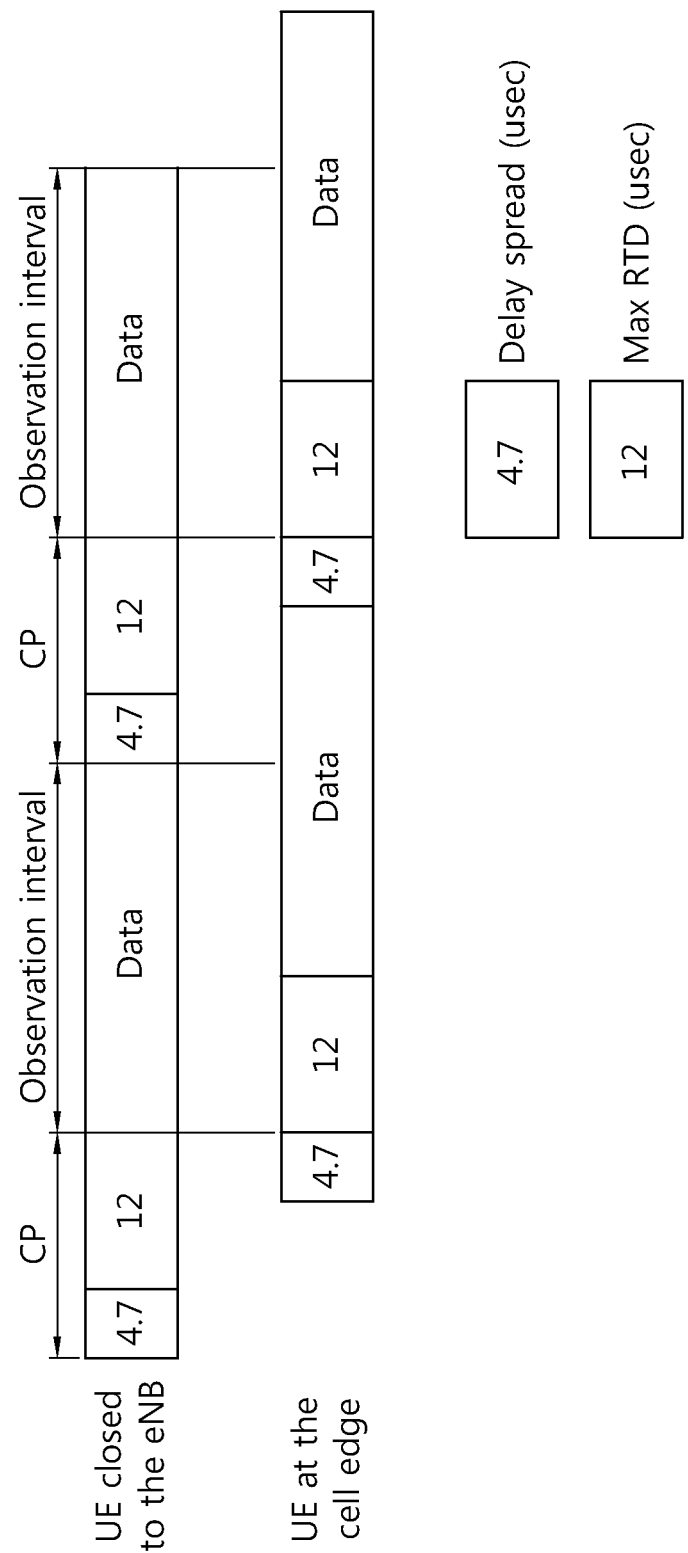
FIG. 8 schematically illustrates a symbol configuration considering the extended CP according to the present invention.

Additionally, FIG. 8 schematically illustrates a symbol configuration considering the extended CP according to the present invention.

As shown in FIG. 8, an interval is 16.7 μsec when using the extended CP, and if it is assumed that the delay spread is 4.7 μsec considering a general cell environment, the max RTD should be shorter than 12 μsec. As an example, in case of utilizing 4.7 μsec for the delay spread, 12 μsec may be utilized for correction of uplink sync for UE. Accordingly, when arranging the RTD value in relation to cell radius, the RTC value may be defined by Equation 2 below.

$$2 \times \frac{X}{(3 \times 10^8)} + \text{delay spread (4.7 } usec) \leq \text{extended } CP \text{ (16.7 } usec)$$  [Equation 2]

Herein, X is a distance between a cell and a D2D UE, and $3 \times 10^8$ (m/s) is speed of light.

When calculating a cell radius with considering this, the maximum cell radius is 1.8 km. That is, if the cell radius is within 1.8 km, the correction of synchronization among D2D UEs may be performed through the extended CP, according to the present invention.

Figure 9:
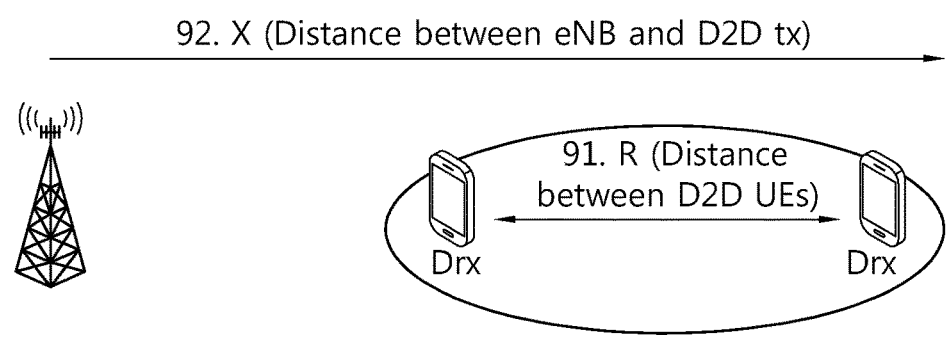
FIG. 9 illustrates an example of a case of delay being occurred between D2D UEs in a wireless communication system to which the present invention is applied.

FIG. 9 illustrates an example of a case of delay being occurred between D2D UEs in a wireless communication system to which the present invention is applied.

Referring to FIG. 9, it is depicted locations of UEs of which the biggest delay is occurred among the delay that may occur between the D2D UEs.

Herein, R (91) means a distance between the D2D UEs. Dtx is a UE that transmits beacon among the D2D UEs, and Drx is a UE that receives beacon. Herein, if Dtx is located farthest way from Drx, the maximum propagation delay occurred between D2D UEs represented by 2R/speed of light. That is because Dtx is located farther as much as R than Drx from signals transmitted from an eNB, the propagation delay of R/speed of light occurs, and in case of transmitting beacon from Dtx, the propagation delay of R/speed of light as much as R, the distance between D2D UEs, also occurs. As a result, the maximum propagation delay of 2R/speed of light occurs between D2D UEs. This relation is arranged as Equation 3 below.

$$\frac{2R}{(3 \times 10^8)} + \text{delay pread (4.7 } usec) \leq \text{extended } CP \text{ (16.7 } usec)$$  [Equation 3]

Herein, R is a distance between D2D UEs, and $3 \times 10^8$ (m/s) is speed of light.

When calculating R, which is a distance between D2D UEs, the maximum distance between D2D UEs is 1.8 km. That is, if the distance between D2D UEs is within 1.8 km, the delay may be corrected by the extended CP.

Figure 10:
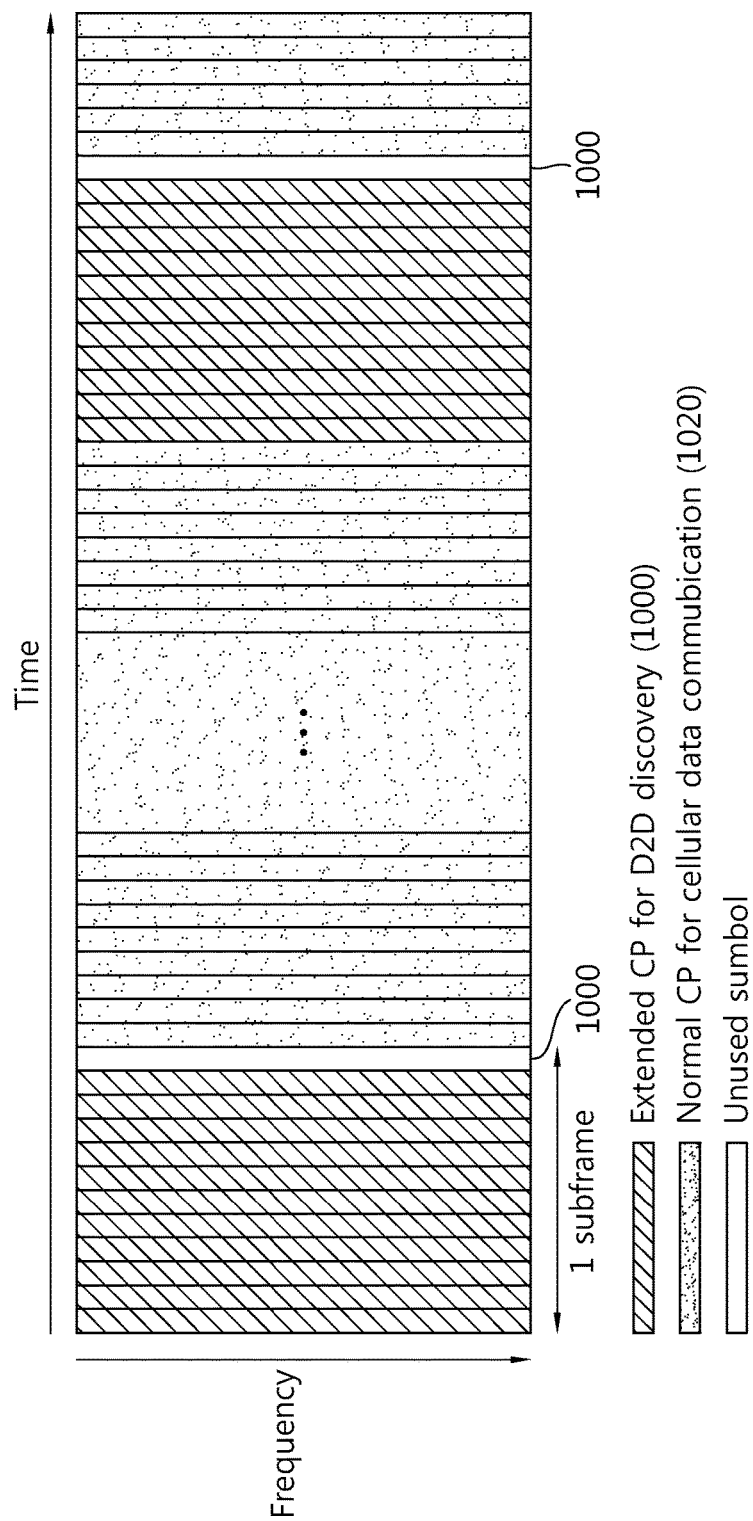
FIG. 10 illustrates an example of a resource that performing a D2D discovery according to the present invention. That is, the way of utilizing extended CP is represented in time and frequency aspect.

FIG. 10 illustrates an example of a resource that performing a D2D discovery according to the present invention. That is, the way of utilizing extended CP is represented in time and frequency aspect.

Referring to FIG. 10, it is assumed that the section 1000 using the extended CP is depicted with deviant crease lines, and the section 1020 using the normal CP is depicted with dots.

According to the present invention, the first subframe is allocated in order to use the extended CP, and the D2D discovery process is performed during the time of one subframe. Herein, since the delay spread and RTD that are elongated due to the use of extended CP influence the symbols of the next subframe that uses the normal CP, total 12 symbols are used in one subframe in case of using the extended CP, and the last $12^{th}$ symbol is not used and leaved like the guard time (GT), thereby not influencing the symbol of the next subframe.

As described above, the whole frequency of the LTE resource for D2D discovery may be used for the D2D discovery in every predetermined period according to dedicated allocation method, and the last subframe or the first subframe of the corresponding extended CP is defined as GT, thereby preventing interference with other symbols. That is, in case of utilizing the extended CP, in order not to influence cellular users using the normal CP, at least one or more symbol in the last or starting position should not be used. In this time, the number of symbols that are not used may be variously configured according to the distance X between the eNB and Dtx.

In addition, a part of frequency of the LTE resource for D2D discovery, that is, a predetermined resource block (RB) may be used for the D2D discovery in every predetermined period according to partial allocation method. That is, the discovery may be performed in a form of RB that includes a plurality of OFDM symbols in the corresponding time domain and a plurality of consecutive subcarriers in frequency domain.

Herein, for the dedicated allocation method, the way of searching resource blocks in the whole frequency domain of a predetermined time by considering asynchronous signal between the D2D UEs in case of not coexisting with a cellular UE at the time of D2D discovery, and considering the distance between the D2D transmission UE and the D2D reception UE. For the partial allocation method, the way of searching resource blocks in a partial frequency domain of a predetermined time by considering asynchronous signal between the D2D UEs in case of coexisting with a cellular UE at the time of D2D discovery, the distance between the D2D transmission UE and the D2D reception UE, the influence on the eNB by the asynchronous signal of the D2D transmission UE, and the distance between the eNB and the D2D transmission UE. Herein, the number of resource blocks $N_{DL}$ included in a downlink slot varies according to a downlink transmission bandwidth which is configured in a cell, and according to this, the resource block for the D2D discovery may be variously defined. This may be determined by a definition of system.

As a more detailed example, in case of dedicate allocation of discovery resources based on LTE, the priority allocation of the RACH and the D2D discovery is considered in case of 10 MHz, and it is allocated to operate on different times if the RACH and the D2D discovery resources are overlapped. The D2D discovery resources may be allocated in five subframes located next to the subframe to which the RACH resources are allocated. In this time, it may be allocated to the whole frequency domain of the determined subframe. As another example, in case of 5 MHz, the RACH and the D2D discovery resources may be allocated to different RBs such that the RACH and the D2D discovery resources may coexist. In this case, the D2D discovery resources may be allocated in the form of being distributed in a predetermined frequency domain of the whole subframe.

Hereinafter, in the present invention, a method of performing UE discovery for effective power use will be described. Since several UEs perform the discovery procedure in the actual D2D communication, the power consumption of UEs is very great in case of performing discovery in asynchronous way. Various methods should be considered such that UEs perform in power-efficient in such a D2D communication.

Largely, the access configuration in the LTE system may be divided to a radio resource control idle (RRC_idle) state and a RRC_connected state. The RRC_connected state is a state in which S1_connection is connected between a UE and a network while the UE is connected to an eNB, and has high average power consumption in comparison with the RRC_idle state. Further, it may be ineffective if the UE transmits beacon for discovery all the time for the D2D communication discovery in the RRC_idle state without a cellular traffic.

Accordingly, the present invention is going to propose a method for searching UE for power-efficient D2D communication with being synchronized with the RRC_idle state. Particularly, since a UE is not connected to a specific eNB in the RRC_idle state, the position of UE is managed in a unit of tracking area (TA) comprised of several eNBs in the MME. As an example, when a message or call is requested in a network, a UE wakes up through a paging process, and after being changed to the RRC_connected state from the RRC_idle state through the random access process of UE, the message or call operation is performed. Herein, the power consumption of UE may be decreased if the discovery is performed with being synchronized among UEs in the RRC_idle state, not in the RRC_connected state. This is because, in the RRC_idle state, the UEs periodically wake up and verify the paging message received, and if there is not message, the UEs go into sleep, that is, are shifted to idle state. The paging message is used for notifying change of system information to the UE in the RRC_idle state and the UE in the RRC_connected state. Accordingly, the UE may receive the paging signal that includes the system information info modification, and then receive the BCCH according to the next changed period.

Meanwhile, in the LTE system, there are four discontinuous reception (DRX) cycles defined for waking up and falling asleep during a predetermined time for paging in the RRC_idle state. As an example, the DRX cycles may be 0.32/0.64/2.56 seconds. The wake up time for a UE to receive a paging message within the DRX cycle in the RRC_idle state is called On Duration, and the On Duration is variously defined from 1 msec to 200 msec. Table 2 below is an example of RRC signaling for the DRX operation of UE. The UE may include configuration information of related timers for the DRX operation and a long DRX cycle as configuration information for the DRX operation from an eNB, and additionally, may include configuration information of a short DRX cycle. In connection with this, Table 2 below is an example of DRX configuration information for the convenience of description.

particularly, based on onDurationTimer, drxStartOffset, shortDRX-Cycle, and longDRX-Cycle, and starts the onDurationTimer at a predetermined time.

In addition, in the LTE system, the paging is determined depending on the value of a paging frame (PF) based on an international mobile subscriber identity (IMSI) value of UE and a paging occasion (PO) value. The PF means a number of radio frame in which the paging is generated, and the PO means a subframe number in which the paging is generated in the PF. According to an example of the present invention, the UE verifies the paging message for On Duration time in the RRC_idle state, in this time, it is assumed that the DRX cycle is 1.28 sec in the RRC_idle state, and the On Duration of UE is 43 msec. In addition, as another example, the DRX cycle is 1.28 sec and the On Duration time is 40 to 60 msec. As yet another example, it is assumed and described that the DRX cycle is 2.58 sec and the On Duration time is 80 msec.

Figure 11:
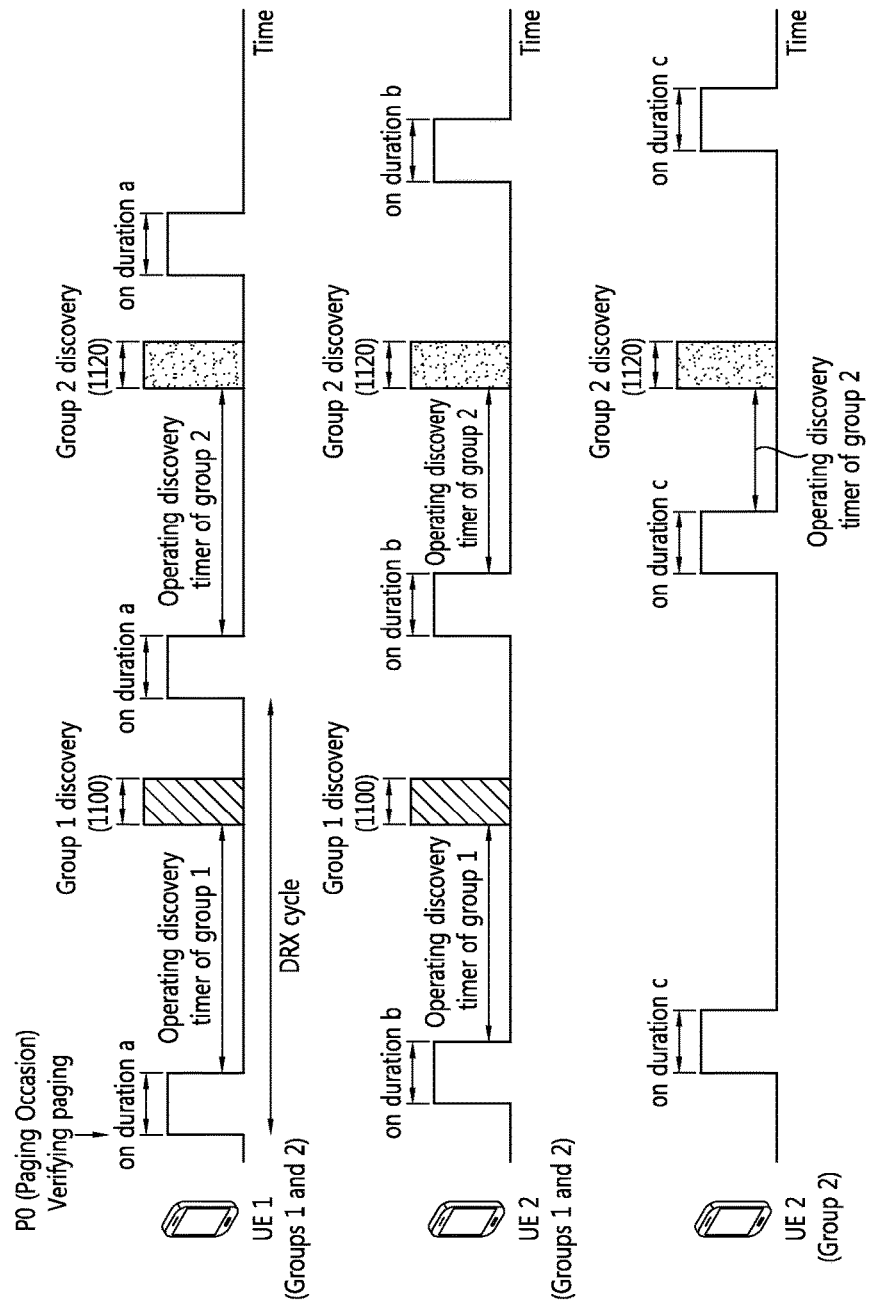
FIG. 11 schematically illustrates the peer discovery procedure through grouping according to the present invention.

Hereinafter, FIG. 11 schematically illustrates the peer discovery procedure through grouping according to the present invention.

Referring to FIG. 11, the case that UEs wake up at the On Duration timing of different Pos in the RRC_idle state and search for each group is represented according to time. Herein, the group of UEs may be classified based on service or ID.

In FIG. 11, the procedure that UE1 and UE2 search a first group 1100 and a second group 1120, and UE3 searches UE1, UE2 and the second group are shown as an example. In particular, each of the UEs wake up in different subframes at the On Duration time of PO, and UE1 (UE2 and UE3) verifies whether there exist a paging radio network temporary identifier (P-RNTI) for paging via the physical downlink control channel (PDCCH) in duration a (duration b and duration c, respectively). In addition, in the RRC_idle state, in addition to the paging message check at the On Duration time, the broadcasting information via downlink, the system information (SI) from the physical downlink shared channel (PDSCH), and so on are received, and based on the cyclic signals of eNB, the UEs in a cell may set a discovery timer in a group.

For example, since the broadcasting channel information in LTE is periodically transmitted from an eNB for every first subframe in a radio frame, the broadcasting channel information may be used as a group timer reference of UEs in a cell. In case that UEs in a cell search for each group by dividing the discovery group, since the UEs are only to search UEs of a specific group desired each other at a predetermined time, the UEs for D2D communication may be searched fast and in power-efficiency with the synchronization method.

Such a present invention defines an operation of group timer determined according to a discovery group, and includes sharing configuration of start/end position of the

TABLE 2

DRX-Config ::= CHOICE { release NULL, setup SEQUENCE { onDurationTimer ENUMERATED { psf1, psf2, psf3, psf4, psf5, psf6, ... , psf200}, drx-InactivityTimer ENUMERATED { psf1, psf2, psf3, psf4, psf5, psf6, ... ,psf0-v1020, ... , spare2, spare1}, drx-RetransmissionTimer ENUMERATED { psf1, psf2, psf4, psf6, psf8, psf16, psf24, psf33}, longDRX-CycleStartOffset CHOICE { sf10 INTEGER(0..9),... sf2560 INTEGER(0..2559) },shortDRX SEQUENCE { shortDRX-Cycle ENUMERATED { sf2, sf5, sf8, sf10, sf16, sf20,..., sf640), drxShortCycleTimer INTEGER (1..16) } OPTIONAL -- Need OR }}

Accordingly, the UE calculates On Duration through the DRX configuration information of the received RRC signal, group timer which is variable for each discovery group. That is, the present invention includes the calculation and the determination of timing when each UE that has different On Duration performs group discovery for the group to which the UE itself belongs. According to an example, although the information for the group discovery may be acquired through broadcast information, each UE may acquire an offset value for inferring start and end timing of the group timer operation from the received PDCCH at a predetermined On Duration. Or, the RRC signaling related to the DRX of each UE may be transmitted with a parameter value for determining start/end of variable timer considering the On Duration according to the group discovery being included. Accordingly, UE(s) in a cell calculates or verifies the discovery active time for searching UE included in the same group at the variable timing which is determined according to a discovery group in addition to the On Duration section of each UE, by referring a cyclic signal or shared and dedicated signal transmitted from an eNB, and through this, operates in discovery activation.

As described above, by considering the power according to the DRX operation of UE, the timing and the group for D2D discovery in the RRC_idle state may be variably defined, and by considering and comparing the power consumption between the RRC_idle state and the connected DRX state, the discovery group may be defined. In this time, in relation to SFN, the service based discovery timing interval and the merits and demerits of power consumption should be considered. For this, the synchronization for D2D discovery may be tuned based on the periodic SFN for the D2D discovery.

Figure 12:
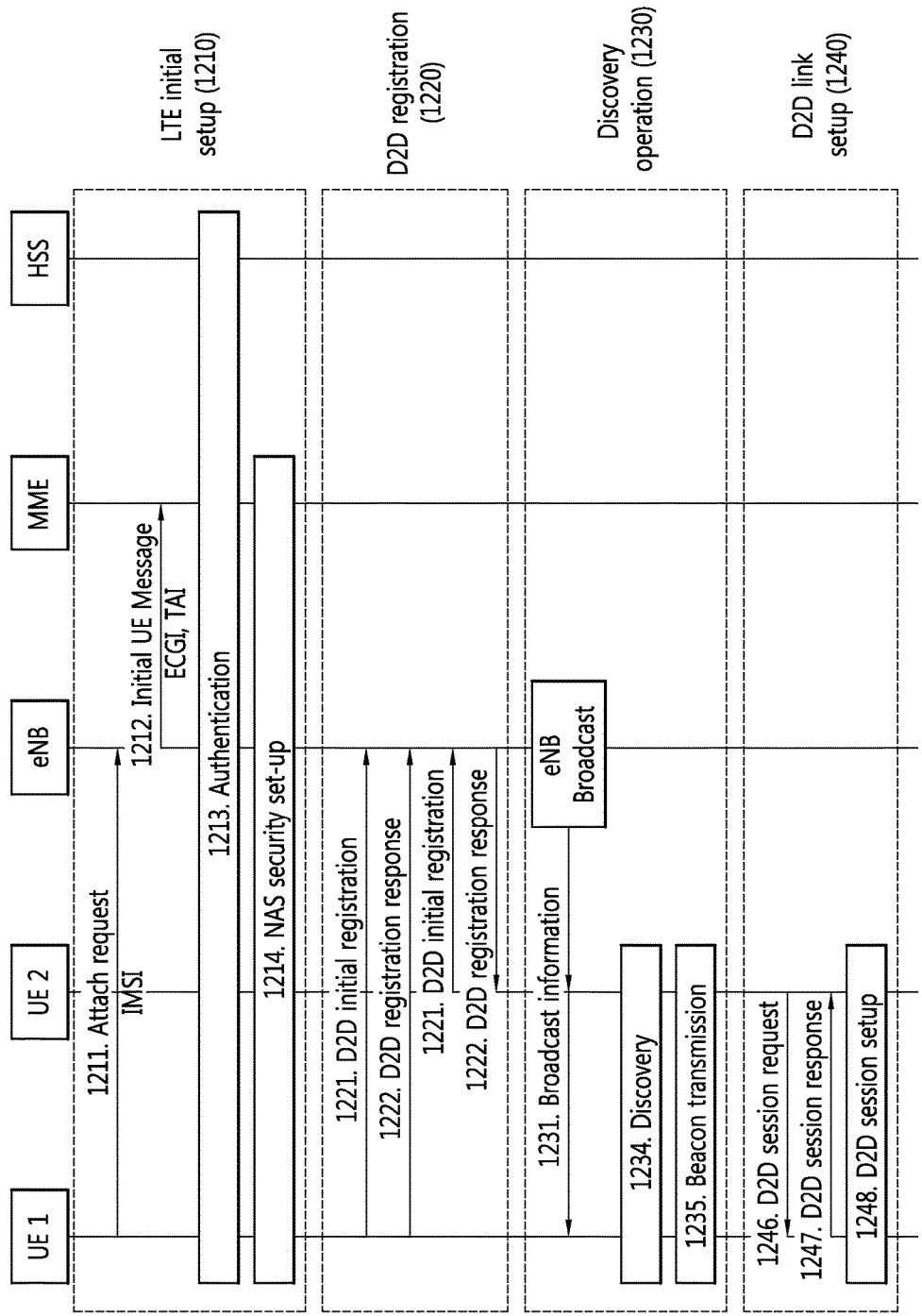
FIG. 12 is a flow chart of message for the D2D peer discovery according to the present invention, and the detailed flow chart of message is shown according to time between UE and system for the D2D group discovery.

FIG. 12 is a flow chart of message for the D2D peer discovery according to the present invention, and the detailed flow chart of message is shown according to time between UE and system for the D2D group discovery.

Referring to FIG. 12, an LTE initial setup procedure 1210 includes the procedure that a UE performs an access request to access a system (steps, 1211 and 1212), and performs authentication process with the system (steps, 1215 and 1217). More particularly, the UE transmits a registration request message including an intrinsic mobile subscriber information (IMSI) to an eNB (step, 1211), the eNB converts this to temporary identification information (e.g., a E-UTRAN cell global identifier (ECGI) and a globally unique temporary identity (GUTI)) for distinguishing by a network, and transmits with a tracking area identity being included to the MME (step, 1212). The MME performs an authentication for UE (step, 1215) and a registration procedure based on a subscriber profile (QoS information) (step, 1217). The NAS security connection is configured between the MME and the UE, and the MME manages the bearer according to the mobility and the service of UE. This is the same as the UE registration procedure in the LTE system.

Later, the UE performs a D2D registration procedure (step, 1220). The D2D registration procedure includes a procedure that the UE notifies the D2D communication to be available in the RRC_connected state to the eNB (step, 1221) and a procedure that the D2D UE that completes the D2D registration procedure receives information of the peer discovery from the eNB (step, 1222). The procedures may be performed by a plurality of UEs that requests the D2D registration. In the present invention, UE2 is exemplified for the procedure.

In a discovery operation procedure (step, 1230), the UEs (UE1 and UE2) in the RRC_idle state periodically wake up to notice a paging channel. In this time, since the time when the UEs wake up are different from each other, the peer discovery is not available when the time to notice the paging. Therefore, according to the present invention, the discovery timing time should be defined for the peer discovery.

In more particular, for this, the eNB configures a discovery group timer that has different values for each peer discovery group to the D2D UEs, in addition to the paging signal, through downlink, and broadcasts this (step, 1231). The broadcasted information includes information of the value of group discovery timer which is defined for each discovery group. The information of group discovery timer may be periodically transmitted in every first frame within the radio frame. Accordingly, the UE verifies a parameter for the group timer which is broadcasted at the corresponding timing and configures (calculates) the subframe for the operation of timer. The parameter for operation of the group discovery timer may further include an offset value which is variably changeable according to the D2D group which is determined by the D2D request of UE or the configuration of eNB, that is, for variably sharing setup the start/end position of the group discovery timer for each discovery group.

Then, in order to synchronize for each group, the UEs operates the group discovery timer (step, 1234), and simultaneously exchanges beacon signals (step, 1235). Herein, the beacon signals are predetermined signals for time and frequency resources for the D2D discovery. The beacon transmission for the discovery among UEs is transmitted in the way of Latin-square, and for this, within the group discovery time the UEs transmit the beacon signals by one and more times within the group discovery time by transmitting the beacon in regular sequence at a predetermined time pattern. Except for the beacon transmission time, the UEs receive the beacon signals from other UE, and finally, the UE that receives the beacon signals performs the D2D communication by setup the D2D link with the UE that transmits the beacon signals (step, 1240).

The D2D link setup procedure (step, 1240) includes the process that UE2 in which the D2D link is setup requests a D2D session to UE1 (step, 1246), and then, completes the D2D session response (step, 1247), and the D2D session is setup (step, 1248).

Figure 13:
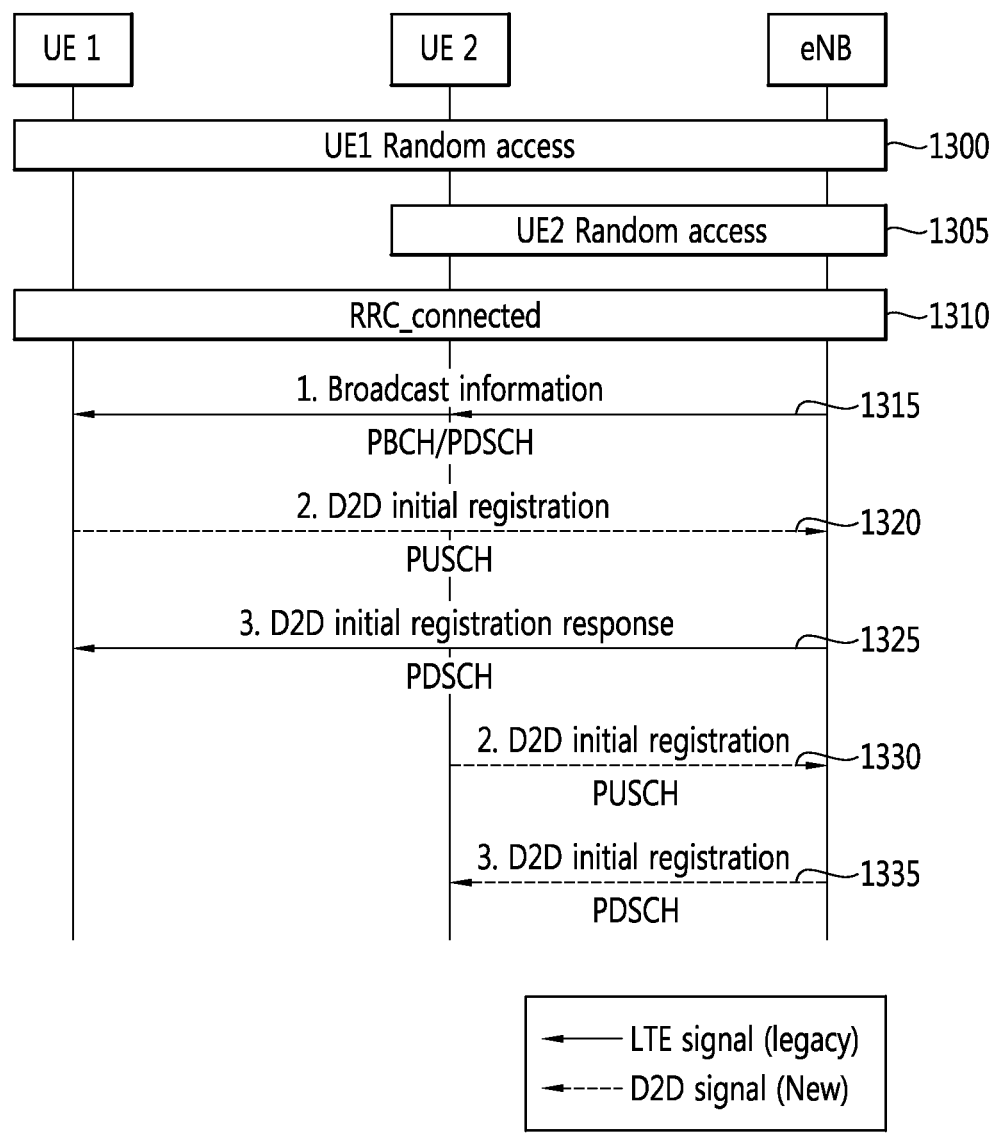
FIG. 13 schematically illustrates a D2D registration procedure according to the present invention.

FIG. 13 schematically illustrates a D2D registration procedure according to the present invention.

Referring to FIG. 13, each of the UEs performs a random access procedure (steps, 1300 and 1305) in order to register a network of the LTE system according to an example of the present invention for the D2D service, and then, shifted to the RRC_connected state (step, 1310).

Herein, the RRC state and the RRC connection method of UE will be briefly described. The RRC state is referred to whether the RRC of UE is logically connected to the RRC of E-UTRAN, called the RRC_connected state if it is connected, and the RRC_idle state if it is not connected. Since the E-UTRAN may be aware of the presence of UE in the RRC_connected state in the unit of cell, the E-UTRAN may effectively control the UE. On the other hand, the E-UTRAN is unable to be aware of UE in the RRC_idle state in the unit of cell, and manages in the CN (e.g., the MME) in the unit of tracking area which is bigger unit of region than the cell. When describing more easily, an initial state of UE is the RRC_idle state, and the UE in the RRC_idle state should be shifted to the RRC_connected state in order to receive services such as voice and data from the cell.

As an example, when a user turns on the power of UE firstly, the UE stays in the RRC_idle state in the corresponding cell after searching a proper cell first. The UE staying in the RRC_idle state is shifted to the RRC_connected state by performing the RRC connection establishment process with the RRC of E-UTRAN only in case that it is required to perform the RRC connection. Herein, examples of the case that it is required to perform the RRC connection includes a case that it is required to perform the uplink data transmission due to a reason such as a user attempts to call, etc., in case of receiving a paging message from the E-UTRAN, a case that it is required to transmit a response message in response to this, and so on. In addition, the RRC_connected state signifies that the E-UTRAN has information (context) of UE.

According to the present invention, in order to synchronize which is tuned for efficient power use for the D2D communication with the eNB, the UE in the RRC_connected state receives information of a discovery timer for each group by receiving broadcasting information through downlink, system information (SI) which is transmitted via the PDSCH or the PBCH, and so on (step, 1315).

Later, the UE transmits a D2D service initial registration message to the eNB via the PUSCH (steps, 1320 and 1330), and in response to this, the eNB transmits a D2D initial registration response message to the corresponding UE via the PDSCH (steps, 1325 and 1335).

Figure 14:
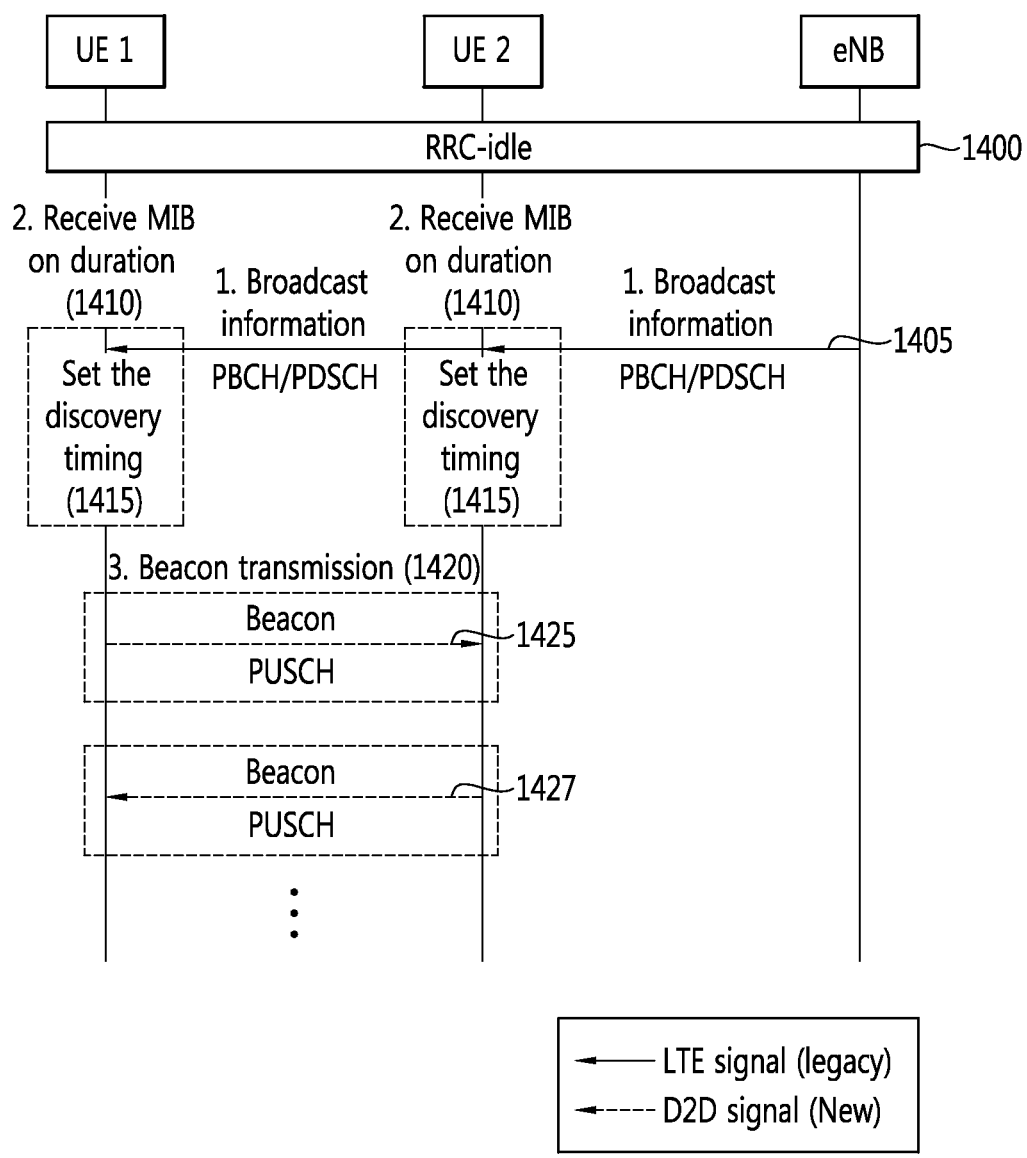
FIG. 14 schematically illustrates a procedure of performing D2D discovery in the RRC_idle state according to the present invention.

FIG. 14 schematically illustrates a procedure of performing D2D discovery in the RRC_idle state according to the present invention.

Referring to FIG. 14, even in the RRC_idle state, all UEs in a cell may receive information of a master information block (MIB) (step, 1410) which is transmitted via the physical broadcasting channel (PBCH) (step, 1405). In this time, the MIB information is transmitted with system bandwidth information which is required to access downlink, a system frame number (SFN), etc. being included. Herein, the SFN will be described in more detail in FIG. 17.

Meanwhile, the system information may be distinguished by the master information block (MIB), the scheduling block (SB) and the system information block (SIB). As described above, by the MIB, a UE may know a physical configuration of the corresponding cell, for example, a bandwidth. The SB notifies transmission information of the SIBs, for example, transmission cycle, and so on. The SIB is an aggregate of system information related each other. For example, a specific SIB includes only information of neighboring cell, and the other SIB includes only information of uplink radio channel that a UE uses.

Accordingly, according to the present invention, although wake up cycles of UEs in the RRC_idle state are different from each other, the UEs in the RRC_idle state may be synchronized with each other by obtaining timing for discovery based on the predefined SFN information (step, 1415). That is, in order to synchronize which is tuned for efficient power use for the D2D communication with the eNB, the UE in the RRC_idle state setup information of the group discovery timer through the broadcasting information via downlink, and through the MIB transmitted via the PBCH from the physical downlink shared channel (PDSCH). This calculates or verifies the discovery active time for searching UE belonged to the same group, and through this, includes an operation of discovery activation. Accordingly, the D2D UEs may know the discovery timing through the broadcasted information, and are synchronized with each other. Herein, the discovery timing may be setup with being varied for each discovery group, and also include different discovery timing values by making the broadcasting information corresponding to the group.

The D2D UEs wake up at a discovery time according to the discovery timer, and perform the peer discovery operation by transmitting beacon via the PUSCH (step, 1420). As described above, in order for the UEs to be synchronized for each group, after operating the group discovery timer, the UEs exchange beacon signals at the same time (steps, 1425 and 1427). Herein, the beacon signals are predefined signals for time and frequency resources for the D2D discovery.

Figure 15:
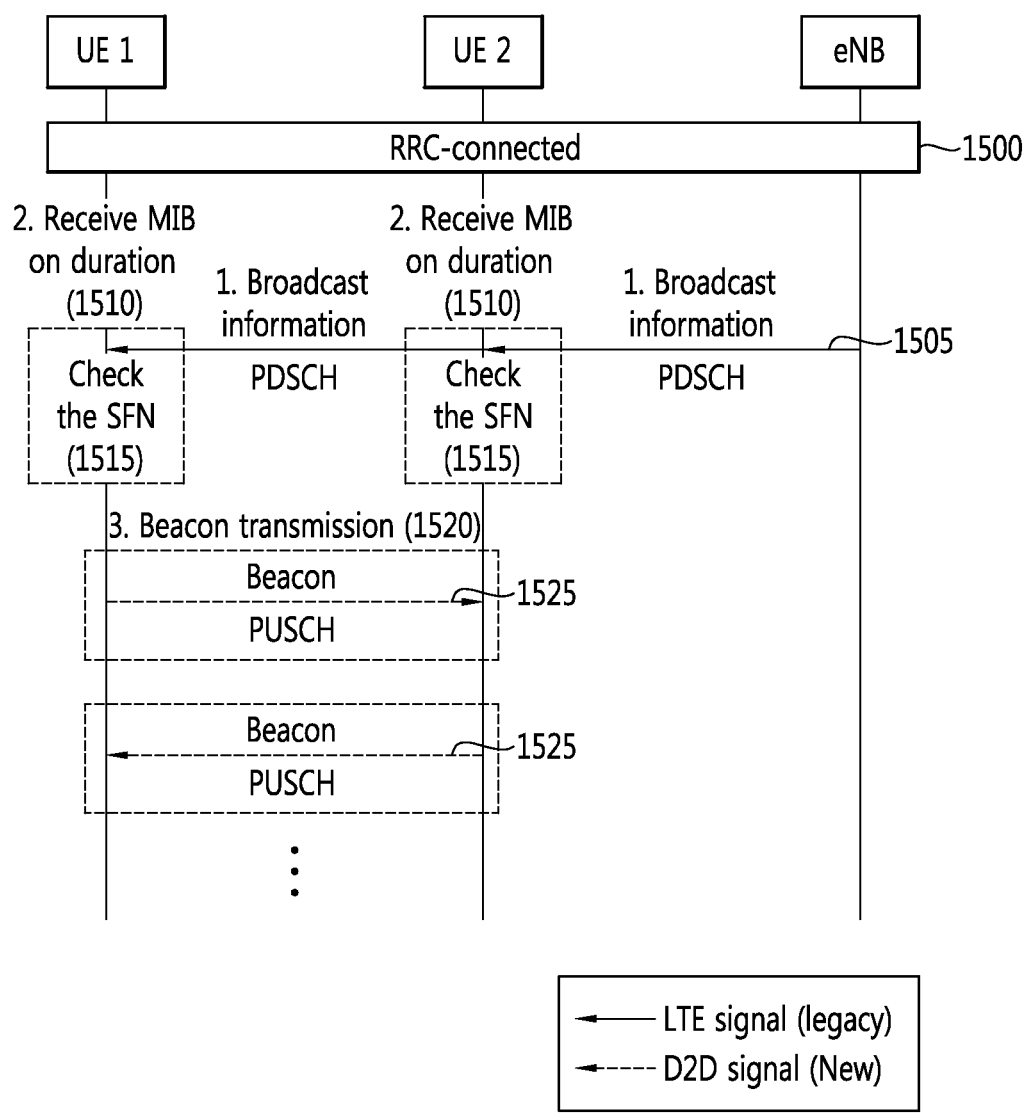
FIG. 15 schematically illustrates a procedure of performing D2D discovery in the RRC_connected state according to the present invention.

FIG. 15 schematically illustrates a procedure of performing D2D discovery in the RRC_connected state according to the present invention.

Referring to FIG. 15, the procedure of performing the D2D discovery in the RRC_connected state includes a procedure which is similar to the procedure in the RRC_idle state described in FIG. 14. The UEs in the RRC_connected state may receive broadcasted information (step, 1510) which is transmitted via the PDSCH (step, 1505). In this time, the MIB information includes the system bandwidth information which is required for downlink access, the SFN, and so on. Accordingly, the UEs in the RRC_connected state may know the beacon discovery timing by checking the SFN received through the broadcast information (step, 1515). Herein, the discovery timing may be variably setup for each discovery group, and may include different discovery timing values corresponding to the broadcast information.

The D2D UEs performs the peer discovery for the D2D service by waking up at the discovery time (step, 1520). As described above, in order for the UEs to be synchronized for each group, after operating the group discovery timer, the UEs exchange beacon signals at the same time (steps, 1525 and 1527). Herein, the beacon signals are predefined signals for time and frequency resources for the D2D discovery.

Figure 16:
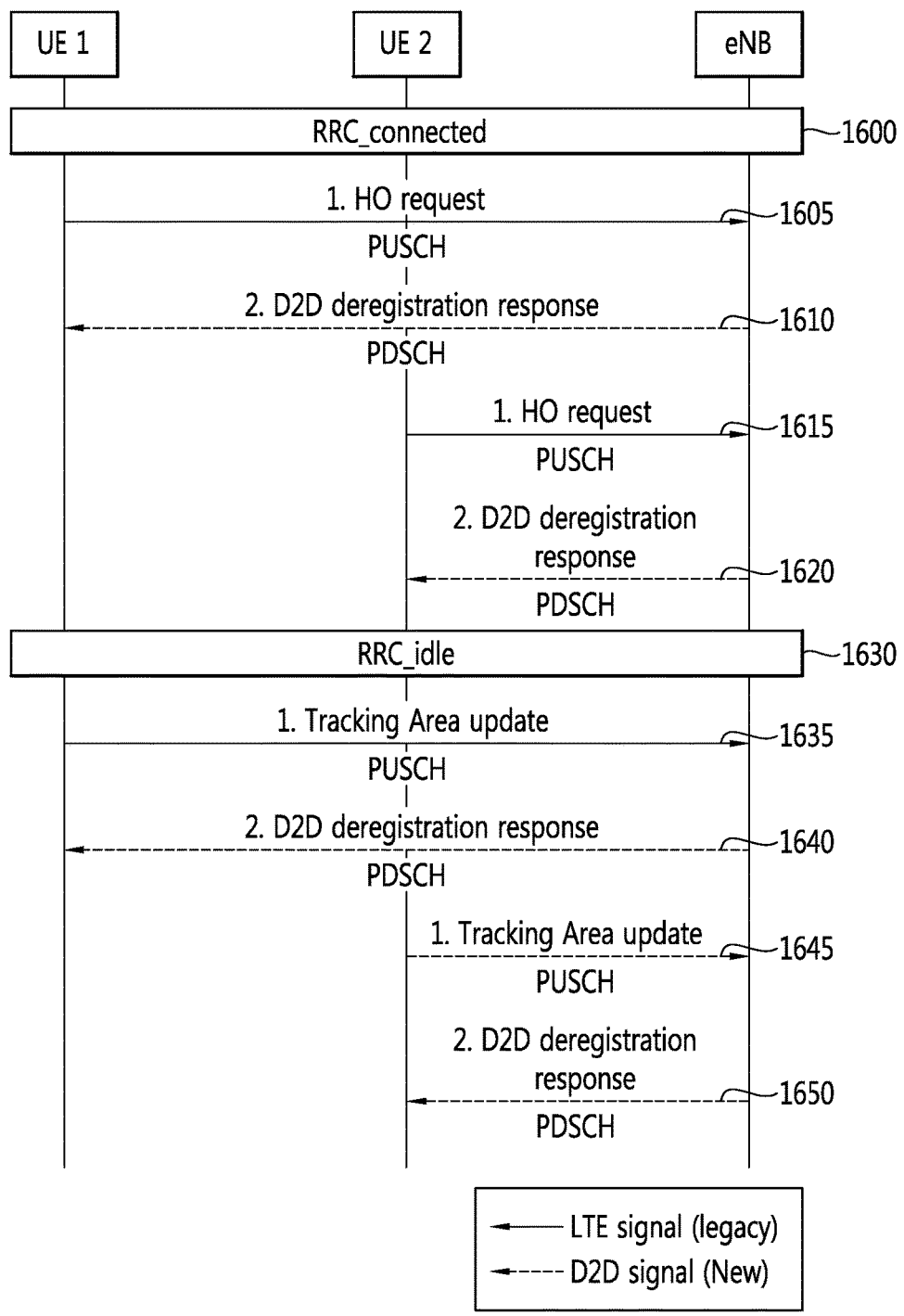
FIG. 16 schematically illustrates a D2D discovery registration release procedure according to the present invention.

FIG. 16 schematically illustrates a D2D discovery registration release procedure according to the present invention.

Referring to FIG. 16, in the RRC_connected state, a UE 1600 transmits a handover request when the UE is going to get out of the corresponding eNB (steps, 1605 and 1615). Accordingly, the eNB may determine that the UE is going to get out of a cell through the handover. In response to the handover request message, by transmitting the D2D discovery registration release message, the D2D peer discovery may be deregistered (steps, 1610 and 1620).

Similar to the RRC_connected state, since the eNB setup the tracking area of the UE in the unit of eNB for the D2D service, the UE in the RRC_idle state (step, 1630) performs a tracking area update procedure in case that the UE in the RRC_idle state moves getting out of the cell (steps, 1635 and 1645). In this case, the eNB determines that the UE is getting out of the cell, and in response to this, may release the D2D peer discovery service by transmitting a D2D discovery registration release response (steps, 1640 and 1650).

In describing again, through a response message in response to the handover request message by the UE in the RRC_connected state, or by transmitting the existing handover response message with the information of discovery deregistration for the D2D service being included, the effect of releasing the D2D service without any additional separate signaling for the D2D registration release by the UE. In addition, through a response message in response to the tracking area update request message according to the tracking area update procedure by the UE in the RRC_connected state, or by transmitting a response message such as an update location response message, and so on with the information of discovery deregistration for the D2D service being included, the effect of releasing the D2D service without any additional separate signaling the UE.

Herein, the handover to the eNB from the UE and the tracking area update message are transmitted via the PUSCH, and deregistration of the D2D discovery service from the eNB to the UE is transmitted via the PDSCH.

Figure 17:
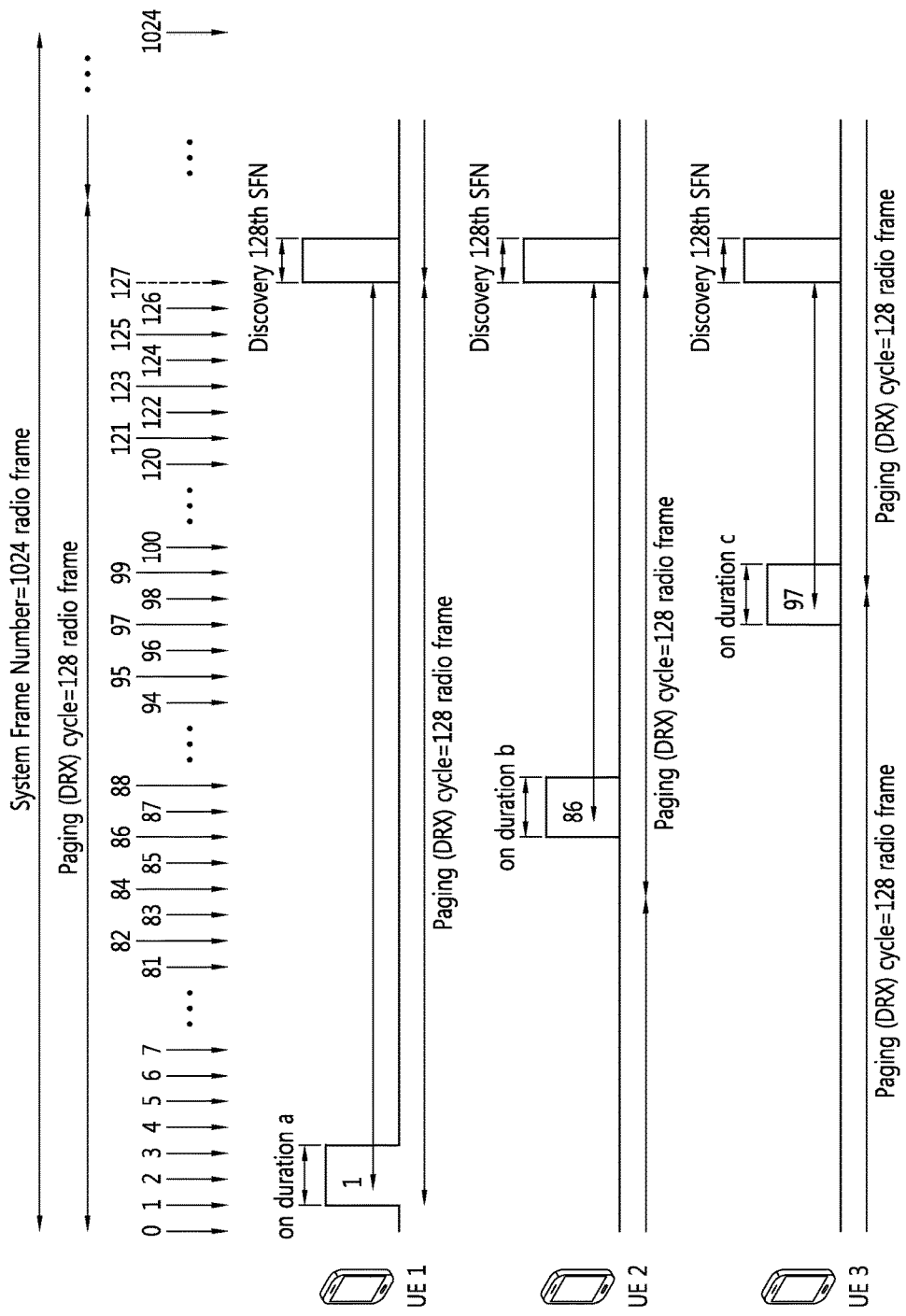
FIG. 17 schematically illustrates a discovery procedure based on the SFN according to the present invention.

FIG. 17 schematically illustrates a discovery procedure based on the SFN according to the present invention.

Referring to FIG. 17, in the LTE system, several pieces of information are indispensable when UEs access an eNB through the transmitted MIB information of the PBCH.

The MIB includes the most fundamental parameters for a UE to access an eNB. The MIB message is broadcasted through a logical channel (BCH) in a cycle of 40 msec, and the MIB transmission is repeated in all radio frames within the cycle of 40 msec. That is, the first subframe is transmitted in a unit of 10 msec, in this time, the SFN information is transmitted within the MIB.

In addition, the SFN is an absolute value since the SFN represents a frame number within the range of eNB, and a time when UEs wake up to look up the paging channel may be represented by the SFN. Accordingly, in the present invention, by defining the section for the D2D peer discovery to be timing for the SFN, it may be available that all UEs may perform the peer discovery at the same time.

As an example, FIG. 17 illustrates, when the UEs wake up from the RRC_idle state by different cycles, how to perform the discovery procedure at the same timing by the UEs. For example, UE1 receives the first SFN, and UE2 wakes up by another cycle and receives the $86^{th}$ SFN. And, UE3 wakes up by the other cycle and receives the $97^{th}$ SFN.

In this time, if the UEs know the information that the UEs perform the discovery procedure at the timing of $128^{th}$ SFN, the UEs wake up from the RRC_idle state at the same timing and perform the discovery procedure with being synchronized with each other.

An example of the present invention is a case that the D2D discovery timing is SFN=128*N, and the D2D UEs are synchronized for the D2D discovery based on the cyclic SFN. Herein, by variably setup the value of N for each discovery group, different discovery timings for each discovery group may be defined.

In relation to this, FIG. 18 schematically illustrates an example of a MIB configuration according to the present invention.

Referring to FIG. 18, a size of SFN is 2 bits through decoding of the PBCH, and configured in a form of total 10 bits, and accordingly, may be represented by a value of 1024. Accordingly, the SFN information is represented by 0 to 1023, and transmitted in a cycle of total 1024 msec such that one piece of the SFN information is transmitted with being included in the MIB in every subframe.

Accordingly, the UE may be tuned with the discovery synchronization by acquiring the SFN for D2D through the MIB.

Figure 19:
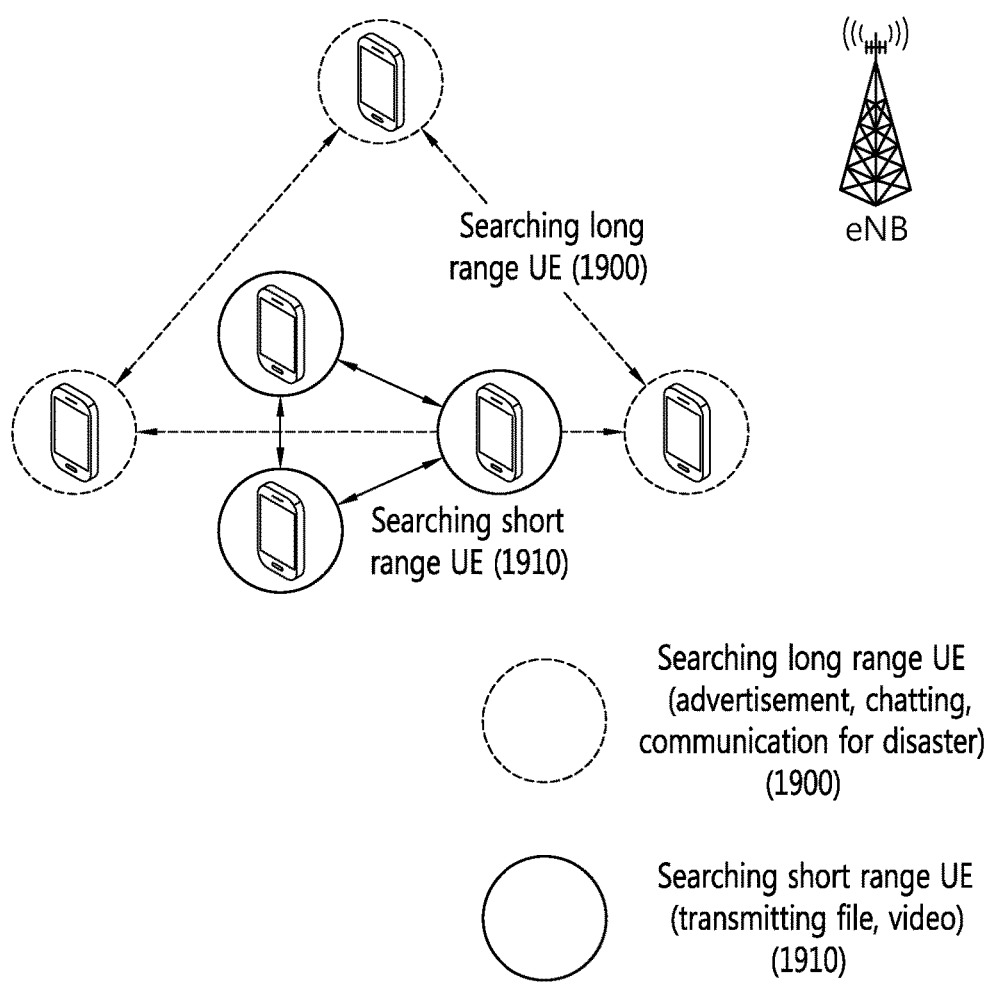
FIG. 19 illustrates an example of setup a discovery range for each service according to the present invention.

FIG. 19 illustrates an example of setup a discovery range for each service according to the present invention, and illustrates a method of variably controlling a beacon transmission power for each service in case of searching a service that requires the D2D communication.

Referring to FIG. 19, D2D communication UEs may setup a beacon transmission power range for the discovery, and the range setup may be variably configured for each service.

For example, in case of trying to transmitting small amount of traffic using the D2D communication, transmission for advertisement, chatting, social networking and communication for disaster does not take long time. Accordingly, even in case that UE located nearby or UE located far way communicates by searching, the UE power consumption is relatively low. On the other hand, in case that large amount of traffic is required, for example, in case of video, file sharing, etc., since the transmission between D2D UEs takes long time, the UE power consumption may be great. In this case, rather than communication between D2D UEs, fast and stable communication through an eNB may be effective. Accordingly, it may be relatively power-efficient that the D2D UEs that are going to transmit the large amount of traffic search UEs nearby by controlling the transmission power of beacon. Therefore, it is controlled that when performing D2D discovery, the UEs setup the beacon power based on service.

Figure 20:
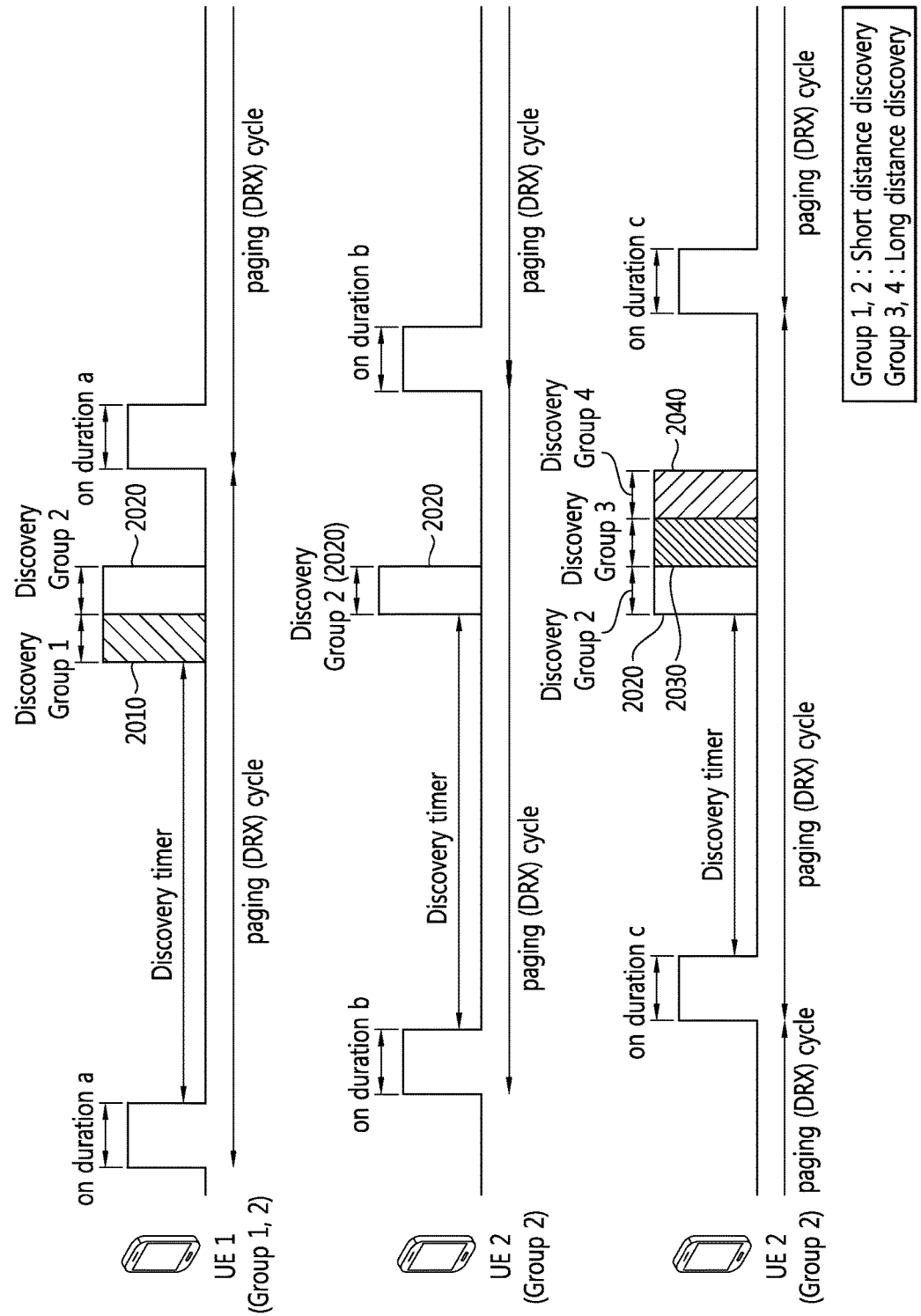
FIG. 20 schematically illustrates a method of assigning different SFN and power for each service according to the present invention.

FIG. 20 schematically illustrates a method of assigning different SFN and power for each service according to the present invention.

Referring to FIG. 20, D2D UEs may perform the peer discovery only for the service sorts that belong to the UE itself. This may be more effective than performing the peer discovery for all sorts of services. In order to do so, it is proposed that peer discovery section is divided for each service. In this time, the time occurred for each service is assigned in a unit of SFN. Accordingly, each UE may wake up and perform the peer discovery only when its own service time. For this, the discovery based on service is to be performed by dividing the discovery group for each service by a specific time.

As an example, the discovery timing may be differently configured by defining the SFN=128*N−(1*m), and by variably defining the offset value m for a reference timing according to the discovery group. Herein, in case that N=1, it may be configured that discovery group 1 performs discovery in $125^{th}$ SFN, that is, SFN=128*1−(1*3), by assuming m is 3, discovery group 2 performs discovery in $126^{th}$ SFN, that is, SFN=128*1−(1*2), by assuming m is 3, discovery group 3 performs discovery in $127^{th}$ SFN, that is, SFN=128*1−(1*1), by assuming m is 2, and discovery group 4 performs discovery in $128^{th}$ SFN, that is, SFN=128*1−(1*0), by assuming m is 1.

Or, in case of performing several services at once and at the same time, by assigning the whole frequency region of a subframe to be different from the group frequency region which is divided in detail according to each service or the same service, it may be controlled that the discovery is performed through different resources distinguished for each service. That is, it is controlled that the discovery is performed differently for each service by allocating subcarriers 0 to 11 to discovery group 1 at the same discovery timing, by allocating subcarriers 12 to 23 to discovery group 2, that is, by defining discovery group for each resource block. In this time, resource allocation for asymmetric discovery area and the like may also be performed.

Accordingly, since the UEs may rapidly search unnecessary signal and UEs that perform the same service with each other, the energy consumption consumed when performing discovery may be decreased.

In addition, when searching UEs based on different services each other, the short range peer discovery to search UEs nearby by considering beacon power for performing the discovery for each service decreases the beacon power. On the other hand, when searching UEs based on long range service, the beacon power is increased.

Figure 21:
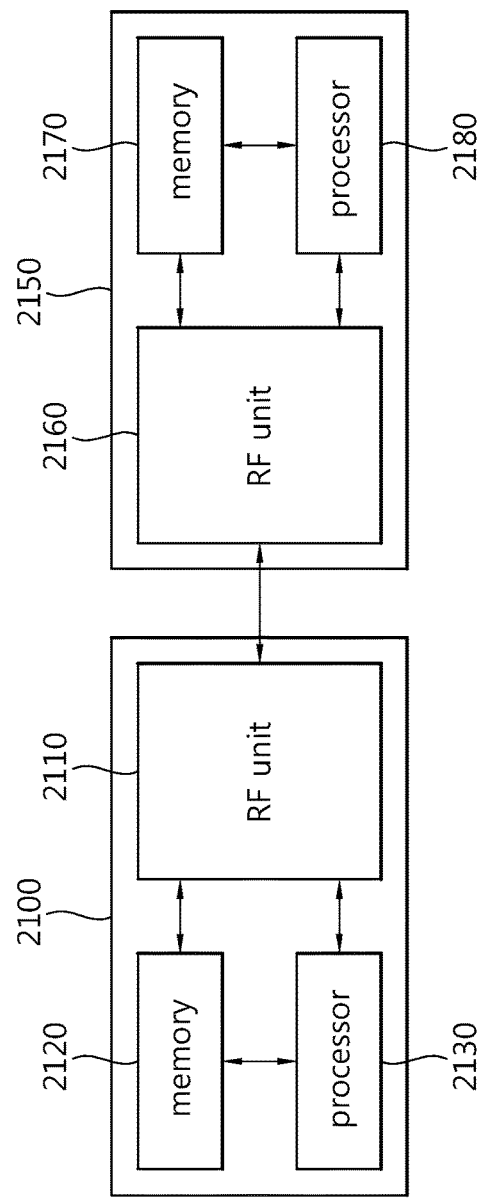
FIG. 21 schematically illustrates a structure of wireless communication system according to the present invention.

FIG. 21 schematically illustrates a structure of wireless communication system according to the present invention.

Referring to FIG. 21, a UE 2100 includes a radio frequency (RF) unit 2110, a memory 2120 and a processor

2130. The RF unit 2110 is connected with the processor 2130, and transmits/receives radio signals.

The processor 2130 is an entity to perform functions, processes, methods, and so on, and performs the operation for FIG. 1 to FIG. 20 of the present invention. Particularly, the processor 2130 according to the present invention may support simultaneous access or partial access of the D2D communication and the cellular communication according to the capacity of UE by receiving the configuration information and the resource allocation information indicated by a network, which is a higher system. In this time, the processor 2130 may also perform the communication with other D2D UE by detecting a link that performs the D2D communication without signaling of eNB.

Particularly, according to the present invention, the processor 2130 verifies resources allocated to perform the D2D communication. Herein, the resources include verifying the frequency region for performing discovery at the discovery timing for performing D2D discovery and at a predetermined timing. This may receive the On Duration according to the DRX configuration and the paging message according to the On Duration. In particular, the resources include receiving and acquiring the SFN information for the D2D service through the broadcasted MIB or SI. Accordingly, the processor 2130 verifies the service based discovery timing interval in relation to the SFN for the D2D communication, and controls to perform transmission by different beacon power for each service.

Herein, the processor 2130 may acquires the SFN value through different messages according to the RRC state of UE, and may also perform the D2D registration release through the handover/tracking area update procedures. Of course, the resource check includes verifying the information of resource allocation information of the PDCCH, the PDSCH, the PUSCH and the PUCCH. Accordingly, it is supported that the UE connected to the D2D link performs the reception/transmission for the PDCCH and the PUSCH in a subframe which is a predetermined starting point by using information of the received DRX configuration. This may receive the information of time or frequency resources from an eNB in order to perform the D2D communication, and the information of the discovery timing may be performed via the PDSCH, the PBCH or the PMCH. In addition, by considering the RRC state of UE, the RRC connection setup procedure may be performed, or the D2D discovery service may be released through the handover or the tracking area update procedure according to the request of UE.

In order to perform discovery at different timings according to the discovery group, the SFN includes receiving the SFN determined for each D2D service, or additionally receiving the offset value for each discovery group by receiving the SFN value for reference group for tuning the D2D synchronization. The processor 2130 performs discovery by differently controlling/calculating the discovery section for each discovery group through the received SFN. In this time, in order to perform discovery at the same timing, the discovery for each group may be performed in a predetermined resource block (frequency domain). Additionally, the processor 2130 controls the beacon transmission by considering the power determined for each discovery group when performing discovery in a predetermined time or frequency domain.

As described above, the memory 2120 is connected with the processor 2130, and includes information for supporting all operations of the processor 2130.

Meanwhile, a network 2150 includes a radio frequency unit 2160, a processor 2180 and a memory 2170. The RF unit 2610 is connected with the processor 2180, and transmits/receives radio signals. Herein, the network may be configured in a form that a part of entity of the eNB and a part of entity of the higher core network are partially supported according to the operation.

The processor 2180 of the network according the present invention is an entity to perform functions, processes, methods, and so on, and performs the operation for FIG. 1 to FIG. 20 of the present invention. That is, the resource allocation is performed by considering capacity information, service state, channel state, and so on of UEs in a cell. Particularly, according to the present invention, the resources may be allocated by distinguishing the resource for the D2D communication and the subframe for the cellular communication, in addition, according to the present invention, the D2D group is defined according to the D2D data, and the discovery timing information for this is transmitted to the corresponding UEs. In this time, in order to control the discovery timing value for each discovery group, it is controlled to differently setup the timing of discovery group by defining different SFN values for each discovery group or variably defining the offset value m for each discovery group at reference discovery timing. In addition, in order to perform at the same timing for each discovery group, the frequency domain and the resource block may be allocated by differently defining them. In order to perform the D2D discovery, the information of time or frequency resources are transmitted to the UE. The transmission may be performed via the PDSCH, the PBCH or the PMCH.

In addition, by considering the RRC state of UE, the RRC connection setup procedure may be performed or the D2D discovery service may be released through the handover or the tracking area update procedure according to the request of UE.

In addition, the present invention provides information of DRX configuration to the D2D UE. Accordingly, the corresponding UEs may properly receive the allocated resources by transmitting the PDCCH at a predetermined timing.

The memory 2170 is connected with the processor 2180, and includes information for supporting all operations of the processor 2180.

So far, the present invention has been described by reference to the drawings and the embodiments as an example, and it should be understood by those skilled in the art, however, that the present invention can be modified or changed in various ways without departing from the technical principles and scope. Accordingly, the embodiments disclosed in the present invention are not intended to limit the scope of the inventive concept of the present invention, but to describe, and the scope of the inventive concept of the present invention is not limited to the embodiment. The scope of the present invention should be interpreted by the claims below, and it should be interpreted that all inventive concepts within the equivalent scope are included in the scope of the present invention.

What is claimed is:

1. A method for device-to-device (D2D) communication among a plurality of D2D user equipments (UEs) belonging to at least one discovery group, the method comprising:

receiving, by a first D2D UE in a radio resource control (RRC) idle state, broadcast information including timing information from a base station (BS) via a physical channel during an on-duration time, wherein the on-duration time is a wake-up time for the first D2D UE in the RRC idle state to receive the broadcast information based on discontinuous reception (DRX) cycles, and wherein the timing information indicates a discovery timing for synchronizing a peer D2D UE belonging to a same discovery group to which the first D2D UE belongs;

verifying, by the first D2D UE, the discovery timing based on a system frame number (SFN) included in the timing information, wherein the discovery timing is configured to have variable value depending on the at least one discovery group; and exchanging, by the first D2D UE, beacon signals with the peer D2D UE according to the discovery timing without intervention of the BS, wherein the beacon signals are predefined signals for time and frequency resources and exchanging the beacon signals comprises:

receiving a radio resource control (RRC) signal from the BS that includes uplink cyclic prefix (CP) length (ulCyclicPrefixLength) information for performing the D2D communication, wherein the CP length is configured according to a first maximum round trip delay (maxRTD) and a first delay spread between the BS and the first D2D UE and a second maxRTD and a second delay spread between the plurality of D2D UEs;

receiving configuration information for a physical random access channel (PRACH) configured such that the first D2D UE has greater value than a sum of the first maxRTD and the first delay spread;

synchronizing with other D2D UEs discovered by searching D2D in a subframe that has a predetermined extended CP; and verifying the received configuration information.

2. The method of claim 1, wherein the first D2D UE is not connected to the BS.

3. The method of claim 1, wherein:
the physical channel is a physical broadcast channel (PBCH); and
the SFN has a size of 8 bits.

4. The method of claim 1, wherein the physical channel is a physical downlink shared channel (PDSCH).

5. The method of claim 1, wherein receiving the broadcast information comprises:
verifying transmission power variably configured according to the at least one discovery group; and
transmitting the beacon signals with the transmission power variably configured according to the at least one discovery group.

6. The method of claim 5, wherein transmitting the beacon signal comprises:
applying the variably configured transmission power using a time and a frequency resource according to the at least one discovery group.

7. The method of claim 1, wherein:
exchanging the beacon signals comprises transmitting at least one first beacon signal according to the discovery timing when the peer D2D UE transmits at least one second beacon signal according the discovery timing; and
the at least one first beacon signal and the at least one second beacon signal are transmitted according to predetermined time and frequency resources.

8. The method of claim 1, wherein searching D2D comprises not using D2D discovery in at least one symbol configured in the subframe.

9. The method of claim 8, wherein:
searching D2D further comprises verifying whether the at least one symbol is a first or last symbol in the extended CP; and
a number of the at least one symbol is variably configured according to a distance between the BS and the first D2D UE.

10. A first device-to-device (D2D) user equipment (UE) for performing D2D communication among a plurality of D2D UEs belonging to at least one discovery group, the first D2D UE comprising:
a radio frequency (RF) unit configured to transmit and receive radio signals; and
a processor connected to the RF unit and configured to:
receive in a radio resource control (RRC) idle state, broadcast information including timing information from a base station (BS) via a physical channel during an on-duration time, wherein the on-duration time is a wake-up time for the first D2D UE in the RRC idle state to receive the broadcast information based on discontinuous reception (DRX) cycles, and wherein the timing information indicates a discovery timing to synchronize a peer D2D UE belonging to a same discovery group to which the first D2D UE belongs;
verify the discovery timing based on a system frame number (SFN) included in the timing information, wherein the discovery timing is configured to have variable value depending on the at least one discovery group; and
exchange beacon signals with the peer D2D UE according to the discovery timing without intervention of the BS,
wherein the beacon signals are predefined signals for time and frequency resources,
wherein exchanging the beacon signals comprises:
receiving a radio resource control (RRC) signal from the BS that includes uplink cyclic prefix (CP) length (ulCyclicPrefixLength) information for performing the D2D communication, wherein the CP length is configured according to a first maximum round trip delay (maxRTD) and a first delay spread between the BS and the first D2D UE and a second maxRTD and a second delay spread between the plurality of D2D UEs;
receiving configuration information for a physical random access channel (PRACH) configured such that the first D2D UE has greater value than a sum of the first maxRTD and the first delay spread;
synchronizing with other D2D UEs discovered by searching D2D in a subframe that has a predetermined extended CP; and
verifying the received configuration information.

11. The first D2D UE of claim 10, wherein:
the physical channel is a physical broadcast channel (PBCH); and
the SFN has a size of 8 bits.

12. The first D2D UE of claim 10, wherein the physical channel is a physical downlink shared channel (PDSCH).

13. The first D2D UE of claim 10, wherein receiving the broadcast information comprises:
verifying transmission power variably configured according to the at least one discovery group; and
transmitting the beacon signals with transmission power variably configured according to the at least one discovery group.

14. The first D2D UE of claim 10, wherein the processor is further configured to:
maintain a discovery state during a discovery duration; and transmit at least one first beacon signal within the discovery duration when the peer D2D UE transmits at least one second beacon signal according to the discovering timing, wherein the at least one first beacon signal and the at least one second beacon signal are transmitted according to predetermined time and frequency resources.

15. The first D2D UE of claim 10, wherein the first D2D UE is not connected to the BS.

* * * * *